United States Patent
Shveidel et al.

(10) Patent No.: US 12,197,728 B1
(45) Date of Patent: Jan. 14, 2025

(54) DOUBLE-MAPPING TECHNIQUE OF I/O LATENCY OPTIMIZATION

(71) Applicant: Dell Products L.P., Hopkinton, MA (US)

(72) Inventors: Vladimir Shveidel, Pardes-Hana (IL); Nimrod Shani, Raanana (IL); Dror Zalstein, Givatayim (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/221,207

(22) Filed: Jul. 12, 2023

(51) Int. Cl.
G06F 12/00 (2006.01)
G06F 3/06 (2006.01)
G06F 12/0815 (2016.01)

(52) U.S. Cl.
CPC ............ *G06F 3/061* (2013.01); *G06F 3/0655* (2013.01); *G06F 3/0679* (2013.01); *G06F 12/0815* (2013.01)

(58) Field of Classification Search
None
See application file for complete search history.

(56) References Cited

U.S. PATENT DOCUMENTS 10,725,915 B1 * 7/2020 Jagtap ................ G06F 12/0868
2020/0349078 A1 * 11/2020 Cheng ................ G06F 12/0824
2021/0191628 A1 * 6/2021 Iwase .................... G06F 3/0619

OTHER PUBLICATIONS

U.S. Appl. No. 17/198,551, filed Mar. 11, 2021, entitled Adaptive Turbo Toggling, to Vladimir Shveidel, et al.
U.S. Appl. No. 18/160,404, filed Jan. 27, 2023, entitled System and Method for Managing Data Portion Ownership in a Storage Cluster, to Vladimir Shveidel, et al.

* cited by examiner

*Primary Examiner* — Daniel D Tsui
(74) *Attorney, Agent, or Firm* — Muirhead and Saturnelli, LLC

(57) ABSTRACT

In at least one embodiment, processing can include: receiving, at a first node, a read operation that reads content of a logical address, wherein a second node, but not the first node, owns the logical address; and performing optimized read processing for the read operation. The optimized read processing can include: performing, in parallel, first processing that obtains a first address hint and first content corresponding to the logical address, and second processing that obtains a second address hint corresponding to the logical address; determining whether the first and second address hints match; if the first and second address hints match, determining that first content is valid content stored at the target logical address; if the first and second address hints do not match, determining the first content is not stored at the logical address, and using the second address hint to obtain second content stored at the logical address.

20 Claims, 15 Drawing Sheets

DOUBLE-MAPPING TECHNIQUE OF I/O LATENCY OPTIMIZATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first of a plurality of nodes, a read I/O operation that requests to read current content stored at a target logical address, wherein the first node does not own the target logical address and wherein a second of the plurality of nodes owns the target logical address; and performing optimized read processing for the read I/O operation, wherein the optimized read processing includes: performing, in parallel, first processing and second processing, wherein said first processing includes: the first node performing first address resolution processing for the target logical address and determining a first address hint based on the first address resolution processing for the target logical address; and the first node using the first address hint to obtain first content; and wherein said second processing includes: the first node issuing a first request to the second node to perform second address resolution processing for the target logical address and to return a second address hint based on the second address resolution processing for the target logical address; and the second node sending to the first node a first response to the first request, wherein the first response includes the second address hint corresponding to the target logical address; responsive to the first node receiving the first response, the first node determining whether the first address hint matches the second address hint; responsive to the first node determining the first address hint matches the second address hint, performing third processing including: the first node determining that the first content is valid content stored at the target logical address; and responsive to the first node determining that the first address hint does not match the second address hint, performing fourth processing including: determining that the first content is invalid and is not stored at the target logical address; and the first node using the second address hint to obtain second content, wherein the second content corresponding to the second address hint is valid content stored at the target logical address.

In at least one embodiment, the first request can be a remote procedure call issued from the first node to the second node, and the first response can be a response to the remote procedure call. The first address resolution processing for the target logical address performed by the first node can include the first node using first mapping information including a first plurality of metadata (MD) pages to map the target logical address to the first address hint. The first plurality of MD pages, as used by the first node, may not be guaranteed to map the target logical address to valid content currently stored at the target logical address since the first node does not own the target logical address. The second address resolution processing for the target logical address performed by the second node can include the second node using second mapping information including a second plurality of MD pages to map the target logical address to the second address hint. The second plurality of MD pages, as used by the second node, can be guaranteed to map the target logical address to valid content currently stored at the target logical address since the second node owns the target logical address.

In at least one embodiment, if the first address hint matches the second address hint, the first plurality of MD pages, as used by the first node, can map the target logical address to the first content that is determined to be valid content currently stored at the target logical address, and otherwise the first plurality of MD pages can map the target logical address to first content that is invalid content not stored at the target logical address. The first address hint can be a first indirect pointer (IDP) to a physical storage location on back-end non-volatile storage including the first content. The second address hint can be a second IDP to a physical storage location on back-end non-volatile storage including the second content. The first IDP can be a first address V1 of a first entry E1 of a virtual layer block (VLB), wherein E1 includes a second address PA1 that is a physical storage location on back-end non-volatile storage including the first content, and wherein the first node can obtain the first content in said first processing by performing fifth processing including: reading the first address V1 from a third entry of a MD leaf page comprising the first plurality of MD pages; reading the first entry E1 of the VLB stored at the first address V1, wherein reading the first entry E1 includes reading the second address PA1; and reading the first content stored at the second address PAL.

In at least one embodiment, second IDP can be a first address V1 of a first entry E1 of a virtual layer block (VLB), wherein E1 includes a second address PA1 that is a physical storage location on back-end non-volatile storage including the second content, and wherein the first node can obtain the second content in said fourth processing by performing fifth processing including: reading the first address V1 from a third entry of a MD leaf page comprising the first plurality of MD pages; reading the first entry E1 of the VLB stored at the first address V1, wherein reading the first entry E1 includes reading the second address PA1; and reading the second content stored at the second address PAL.

In at least one embodiment, the first address hint can be an address of, or pointer to, a physical storage location on back-end non-volatile storage including the first content. The second address hint can be an address of, or pointer to, a physical storage location on back-end non-volatile storage including the second content.

In at least one embodiment, processing can include dynamically switching, in accordance with one or more criteria, between the optimized read processing and normal read processing for read I/O operations received by non-owner nodes with respect to target logical addresses of the read I/O operations. The one or more criteria can be based, at least on part, on one or more metrics used to determine whether a system including the plurality of nodes has sufficient resources available to handle the additional resources needed to perform the optimized read processing rather than the normal read processing with respect to read I/Os received by non-owner nodes with respect to target logical addresses of the read I/O operations. The one or more metrics can include any one or more of: one or more cache-related metrics, one or more metrics regarding CPU consumption or utilization; one or more back-end (BE) resource consumption metrics; one or more back-end I/O workload metrics; and a cache hit rate related to cached metadata pages across the plurality of nodes. The one or more criteria can include a first criteria that indicates to process the read I/Os received by non-owner nodes with respect to target logical addresses of the read I/O operations using the optimized read processing when current CPU utilization is below a specified threshold. The one or more metrics can include one or more of: cache utilization, BE disk utilization, BE controller utilization, BE I/O workload, CPU utilization, and processor core utilization.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
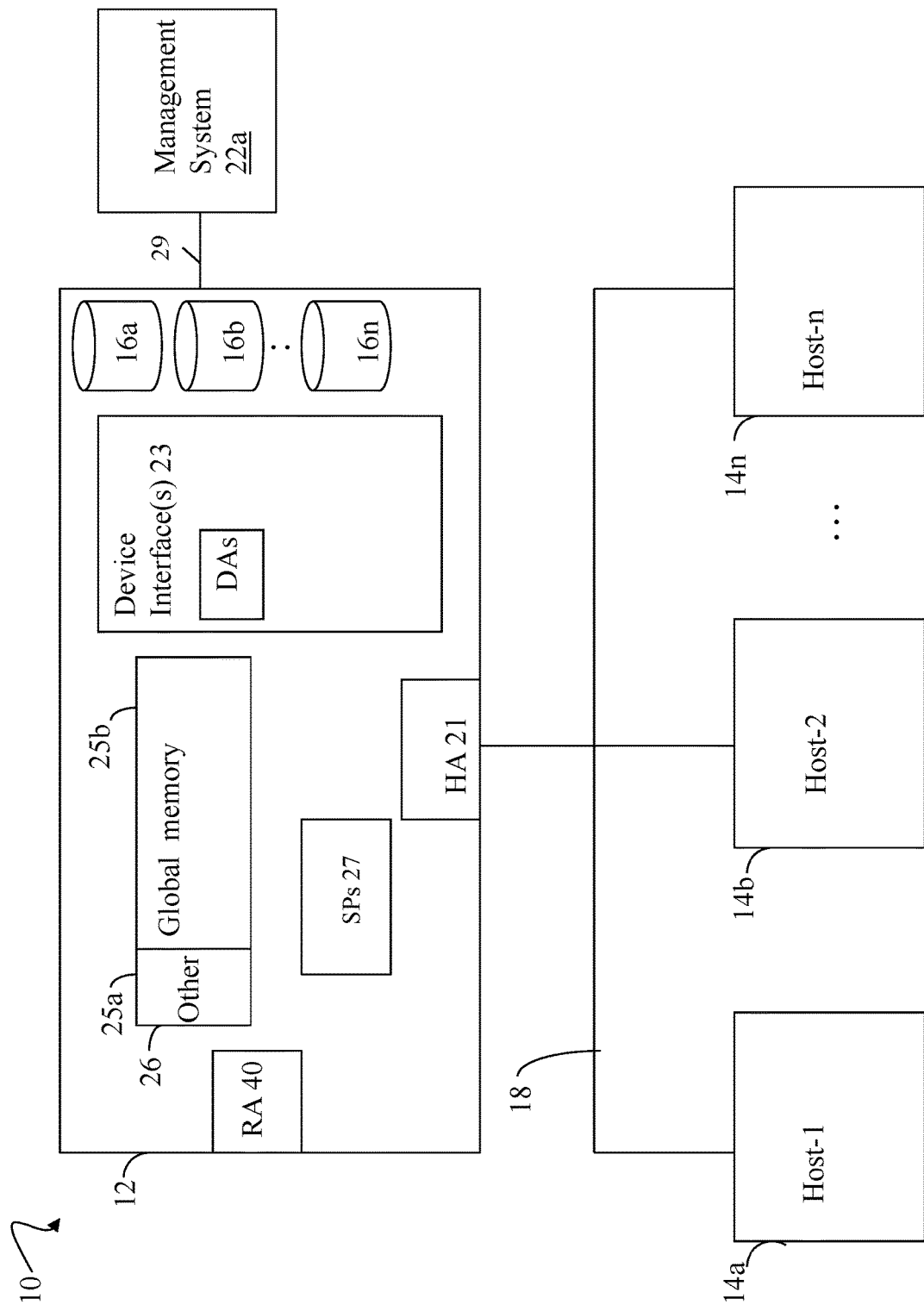
FIG. 1 is an example of components that may be included in a system in accordance with the techniques of the present disclosure.

Existing systems, such as data storage systems, can maintain and utilize a data cache to store frequently accessed pages of content or data such as user data of storage system clients. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can be a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Some systems can include multiple processing nodes where the multiple processing nodes can service I/Os. In such systems, cache usage can be even more inefficient across the multiple processing nodes since the same MD and/or user data or content for servicing I/Os can be cached in node-local caches of all the multiple processing nodes. For example, pages of the same user data and/or MD can be cached locally in caches of the multiple processing nodes. Additionally, due to the shared access of user data and MD among the multiple processing nodes, a synchronization or control mechanism can be used to coordinate access of the shared used data and MD among the nodes. For example, a locking technique can be used synchronize or generally coordinate access among the shared data and MD among the nodes. As another example, a technique can be used which provides a strong separation of responsibilities between the nodes in connection with the shared data and MD.

To improve upon the foregoing, an architecture can be utilized which partitions ownership of the logical address space of user data or content among the multiple processing nodes. In one such architecture, a node assigned a particular logical address can be designated as the owner of the logical address. In at least one system including multiple processing nodes, an I/O directed to a logical address can be received by either the owning node or a non-owning node. One challenge of the foregoing architecture is maintaining data caches on the multiple nodes which can receive and service I/Os. In at least one system, the node A receiving a read I/O requesting to read data from a logical address LA1 can be expected to cache the requested read data even if the receiving node is not the owner of the logical address LA1. However, the peer node B which owns the logical address LA1 can also cache content stored at the logical address LA1, where the cached content on owning node B can be an updated version of content written to the logical address LA1. In this manner, non-owner node A can cache first content C1 as stored at LA1 while owner node B subsequently receives a write to store updated content C2 at LA1 thereby resulting in node B caching updated content C2 as stored at LA1. Thus, coherency of the data caches of the nodes A and B such as with respect to content stored at LA1 cannot be guaranteed. Put another way, without further coordination and synchronization of data caches on the multiple nodes, it is possible for the node B, which owns the logical address LA1, to update its cached content C2 stored at the logical address LA1 and thus silently invalidate the cached content C1 for the logical address LA1 as stored in the non-owning node A's cache. More generally, in scenarios where both nodes A and B can service I/Os directed to the same logical addresses and where both nodes A and B can cache content for the same logical addresses, coherency of data caches of nodes A and B cannot be guaranteed without some additional technique to maintain cache coherency between node local caches of nodes A and B. Generally, such additional techniques to maintain cache coherency between nodes A and B with respect to stored content and/or metadata can result in additional processing and/or incur a performance penalty in order to read the content stored at LA1 from BE non-volatile storage.

Assuming that approximately 50% of I/Os are handled by a non-owning node, the foregoing can generally result in data caching inefficiencies and/or incurring undesirable performance penalties such as with read cache misses.

Accordingly, described in the present disclosure are techniques that provide for improvements in performance.

In at least one embodiment, the techniques of the present disclosure can provide for an improvement in I/O performance in a multiple node system where each of the multiple nodes of the system can receive I/Os and can service such received I/Os.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In connection with discussion herein, a node receiving an I/O operation, such as a read I/O, can sometimes be referred to as the initiator node with respect to the particular I/O operation received at the initiator node.

In at least one embodiment, when a read I/O directed to a logical address LA is received by a non-owner node that does not own LA, the non-owner initiator node can issue a request such as a remote procedure call (RPC) to the owner node to perform processing including resolution processing using mapping information of MD pages associated with the LA. The owner node can then perform resolution processing for LA using the mapping information to obtain a reference, address or pointer that can be used to access the content C1 stored at LA. In at least one embodiment, the reference, address or pointer used to access C1 can be an indirect pointer (IDP) used to access C1. The owner node of LA can return a response or reply to the non-owner initiator node where the response or reply can include the IDP, or more generally a hint or address hint. The non-owner initiator node can then use the IDP (or more generally use the hint or address hint) to access C1 from a physical storage location on BE non-volatile storage. The initiator node can then return C1 to the client that issued the read I/O.

Generally and consistent with other discussion herein, such an RPC and associated response or reply can be expected in about 50% of the I/Os in an active-active system where the I/Os can be received by two nodes of a dual node system. In the foregoing, the associated roundtrip time associated with the RPC and its associated response or reply can result in an additional latency penalty for about 50% of the I/Os which can adversely impact the average I/O latency even in cases where the system has a relatively low I/O workload. Such an adverse impact can be noticeable particularly for read I/Os due to the relative weight of the added round trip time associated with the RPC requests.

As a result in at least one embodiment, the techniques of the present disclosure can include the initiator node of a read I/O directed to LA, where the initiator node is not the owner of LA, also performing processing in parallel with sending the RPC request to the peer node that owns LA. The processing performed in parallel by the non-owner initiator node can include performing address resolution processing for LA locally. The local address resolution processing performed by the non-owning initiator node can result in possibly obtaining the wrong content or invalid content with respect to LA since LA is not owned by the initiator node. In at least one embodiment, local address resolution processing for LA performed by the non-owner initiator node can possibly obtain wrong or invalid content of LA, for example, due to updates made to associated metadata of the mapping information and/or content of LA where such updates can be made by the peer node that owns LA and where such updates can be unknown to the non-owner initiator node.

To avoid the foregoing in at least one embodiment, the local address resolution processing performed by the non-owner initiator node can result in obtaining a first IDP, or more generally, an address hint that can be used to access content C1 stored at LA from BE non-volatile storage. Additionally in at least one embodiment, the processing performed in parallel can include the non-owner initiator node using the first IDP to obtain C1 from BE non-volatile storage. However, the non-owner initiator node does not yet return C1 as obtained using the first IDP to the client. In at least one embodiment, the initiator node can wait until it receives the RPC reply from the peer node that owns LA, where the RPC reply can include a second IDP determined as a result of resolution processing for LA performed by the peer node that owns LA. The first IDP can be obtained by the non-owner initiator node using mapping information for LA and traversing at least a portion of the chain of MD pages corresponding to LA. As noted above in at least one embodiment, when the initiator node receives the read I/O directed to LA that it does not own, the initiator node can send a request, such as an RPC, to the owning peer node to perform address resolution processing for LA. The node which owns LA can perform address resolution processing using corresponding mapping information for LA. The address resolution processing performed by the owning node of LA can include the owning node using mapping information of MD pages and traversing a portion or at least some of the chain of MD pages to obtain the second IDP to the requested read data. In a response or reply to the RPC, the owning node can return the second IDP of the read data to the non-owner initiator node. The initiator node can wait to receive the RPC response and can compare the returned second IDP of the RPC response (returned from the owning node) to its local corresponding first IDP to determine whether the foregoing two IDPs match. If the foregoing two IDPs match, the non-owner initiator node can determine that its retrieved content C1 obtained using the first IDP for LA is valid, and can thereby return C1 for LA to the client in response to the read I/O. If the foregoing two IDPs do not match, the initiator node can determine that C1 as obtained using the first IDP for LA is invalid. In at least one embodiment in this latter case where the foregoing two IDPs do not match, the non-owner initiator node can perform processing including: using the returned second IDP from the owning node to read the current content C2 stored at LA from BE non-volatile storage; and returning the current content C2 for LA to the client in response to the read I/O. In at least one embodiment, it can be expected that the non-owner initiator node is able to retrieve C1 using the first IDP sooner than obtaining current content from BE non-volatile storage using the second IDP of the RPC response (e.g., since the non-owner initiator node must wait to receive the RPC response before it can read the current content using the second IDP of the RPC response). In this case, the processing performed in parallel by the non-owner initiator node can result in a reduced read I/O latency if the foregoing two IDPs match.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus, N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment, an address hint or more generally a hint can be used to access the physical storage location or address storing content for a particular logical address LA. In at least one embodiment, the hint can be an address, reference or pointer used to read the content for the LA from the physical storage location on BE non-volatile storage. In at least one embodiment, the hint can be an IDP used to read the content for the LA from the physical storage location on BE non-volatile storage. In at least one embodiment, the hint can be an address of, or pointer to, the physical storage location on BE non-volatile storage that contains the content for the LA.

In at least one embodiment resolution processing or address resolution processing for LA can use mapping information that includes a VLB page where a MD leaf page entry of the mapping information references a VLB entry of the VLB page, and the VLB entry can further reference a physical location on BE non-volatile storage. In at least one embodiment, the MD leaf page entry of the mapping information for LA can include the address of the VLB entry which further includes an address of a physical location on BE non-volatile storage of C1. In at least one embodiment, the IDP used as the address hint for C1 can be the address of the VLB entry which further includes the address of a physical location on BE non-volatile storage of C1. In further detail in at least one embodiment, address resolution processing performed by a node can include traversing a portion of the chain of MD pages of mapping information which maps LA to a corresponding physical address PA1 including C1 stored at LA. In particular in at least one embodiment, the resolution processing performed by the node traverses the chain of MD pages (e.g., MD top, MD mid, and MD leaf pages) until an entry E11 of a MD leaf is reached where E11 includes a VLB address, V1, which points to, or is an address of, an entry E12 of a target VLB, VLB1. In at least one embodiment, the VLB address V1 can be the IDP determined by the node as part of address resolution processing for LA. The same node or a different node can continue resolution processing for LA and can use the VLB address V1 to obtain a PLB address, PA1, where C1 is stored at PAL. In such an embodiment, resolution processing for LA can include using V1 to read entry E12 of VLB1, where E12 has the address, location or offset denoted by the VLB address V1. Entry E12 of VLB1 includes the PLB address PA1 whereby reading E12 includes reading PAL. PA1 can be used to read or access C1 stored at the address PA1 on BE non-volatile storage.

In at least one embodiment of the present disclosure for a read I/O directed to the logical address LA that is received by a node that does not own LA, a system can dynamically switch between performing optimized read I/O processing of the read I/O and regular or normal read I/O processing of the read I/O in accordance with one or more criteria. In at least one embodiment, the optimized read I/O processing can include the non-owner initiator node issuing the RPC for LA noted above to the peer owner node, and also in parallel, the initiator node locally performing processing for LA also noted above. In at least one embodiment, regular or normal read I/O processing can include the non-owner initiator node issuing the RPC to the peer owner node but can exclude the initiator node locally performing resolution processing for LA which it does not own. In at least one embodiment, regular or normal read I/O processing can include the non-owner initiator node using the hint, such as the IDP, included in the RPC response from the owning peer node to read the current content for LA from BE non-volatile storage, and returning the current content read to the client in response to the read I/O.

In at least one embodiment, the one or more criteria can include one or more metrics such as CPU utilization to decide whether to process a received read I/O using the optimized read I/O processing or regular or normal read I/O processing. In at least one embodiment, the optimized read I/O processing can include performing additional processing that is not performed in connection with normal or regular read I/O processing. In at least one embodiment, the additional processing can include extra opportunistic or optimistic processing performed by the non-owner initiator node including: local address resolution processing performed by the non-owner initiator node for LA to map LA to a corresponding IDP or address hint; and other processing to read content or data using the corresponding IDP or address hint locally determined by the non-owner initiator node. In at least one embodiment, one or more criteria can be used to evaluate the state of the system and decide whether to perform the optimized read I/O processing, and thus whether to perform the additional processing associated therewith. In at least one embodiment, the one or more metrics such as average CPU utilization can be used to evaluate the level of saturation or utilization of the system and its resources and determine whether the system has sufficient available resources to handle the additional processing of the optimized read I/O processing likely to reduce read latency. In at least one embodiment, the one or more criteria can specify to perform optimized read I/O processing, for example, if the current average CPU utilization of the system is below a specified threshold, and otherwise, performing regular or normal read I/O processing. More generally, in at least one embodiment, the one or more criteria can specify to perform optimized read I/O processing if the system has sufficient resources available, and otherwise, performing regular or normal read I/O processing.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23.

Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
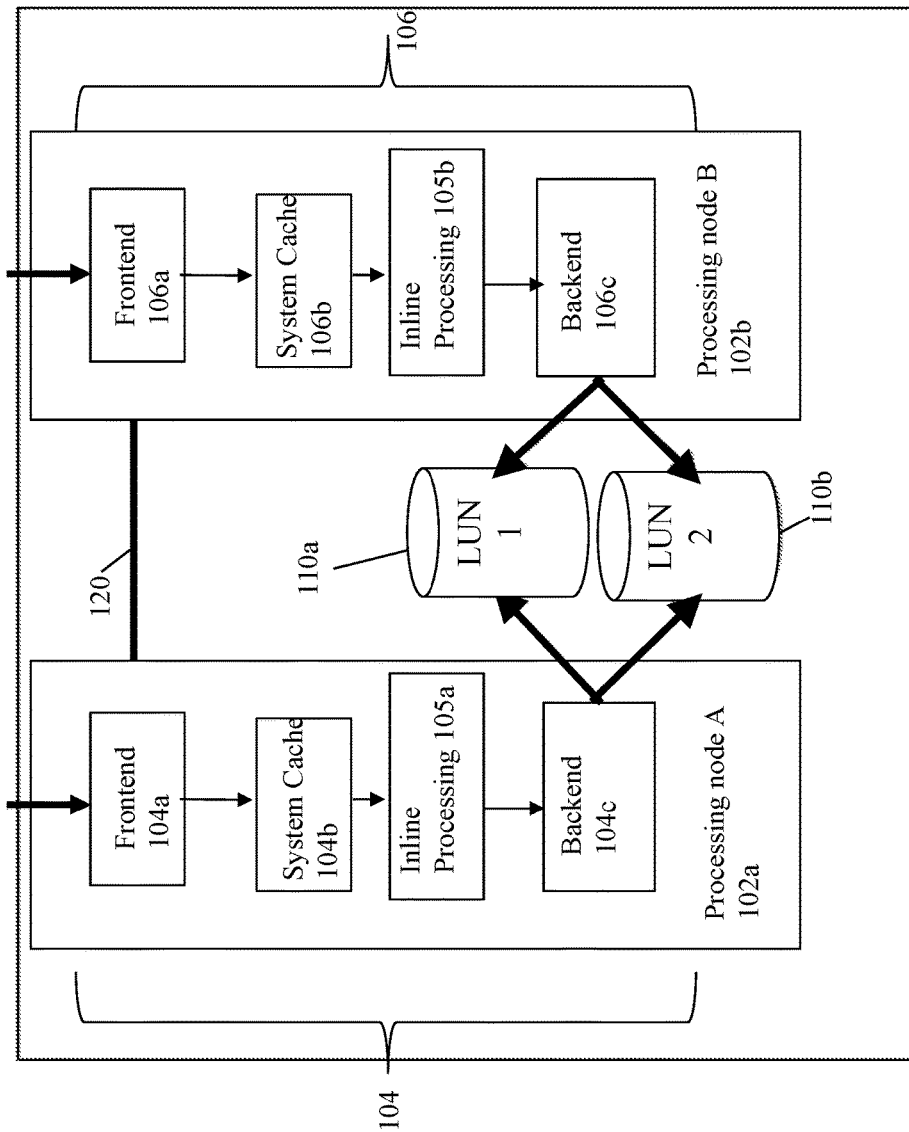
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
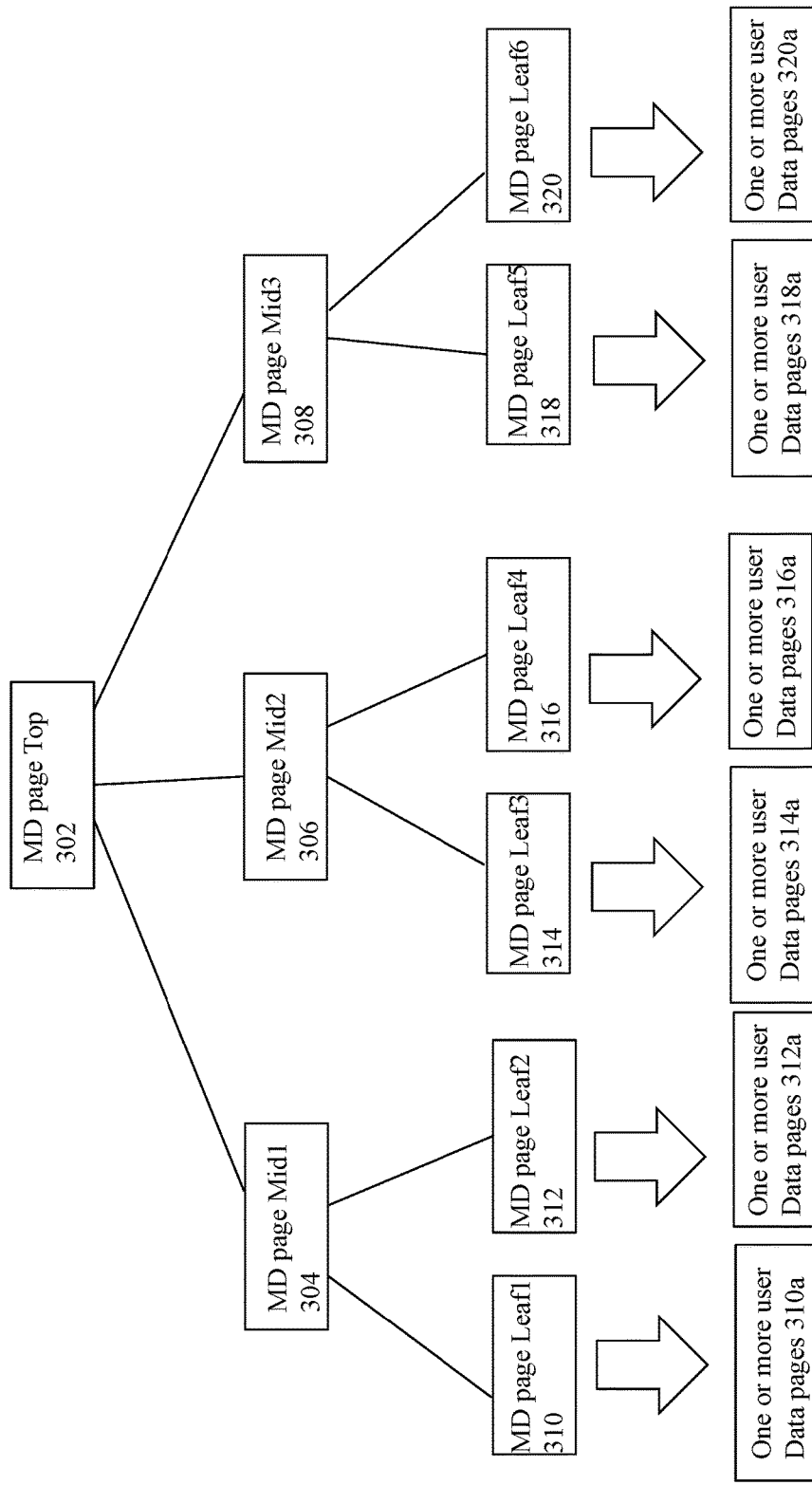
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
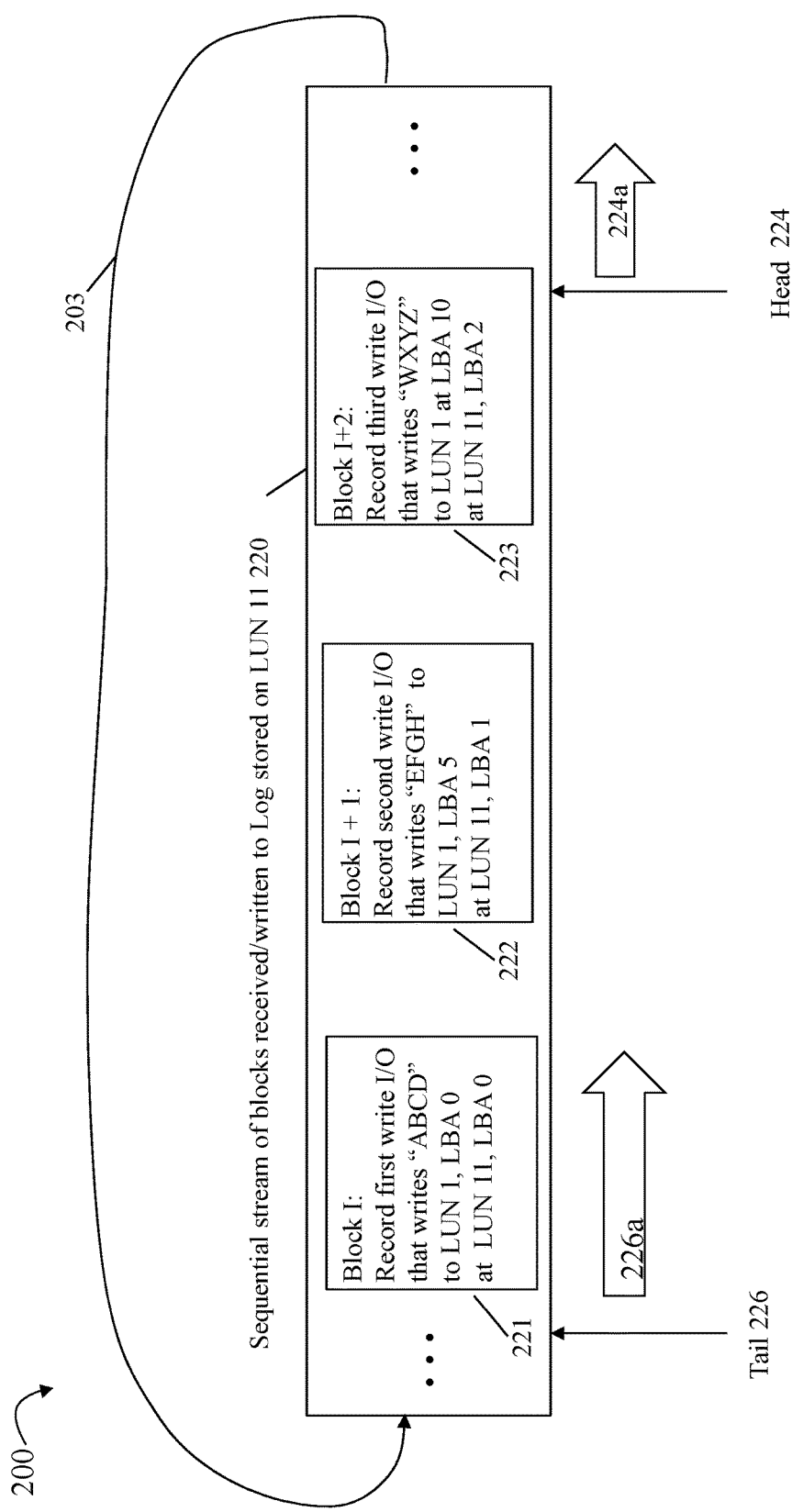
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks 1221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
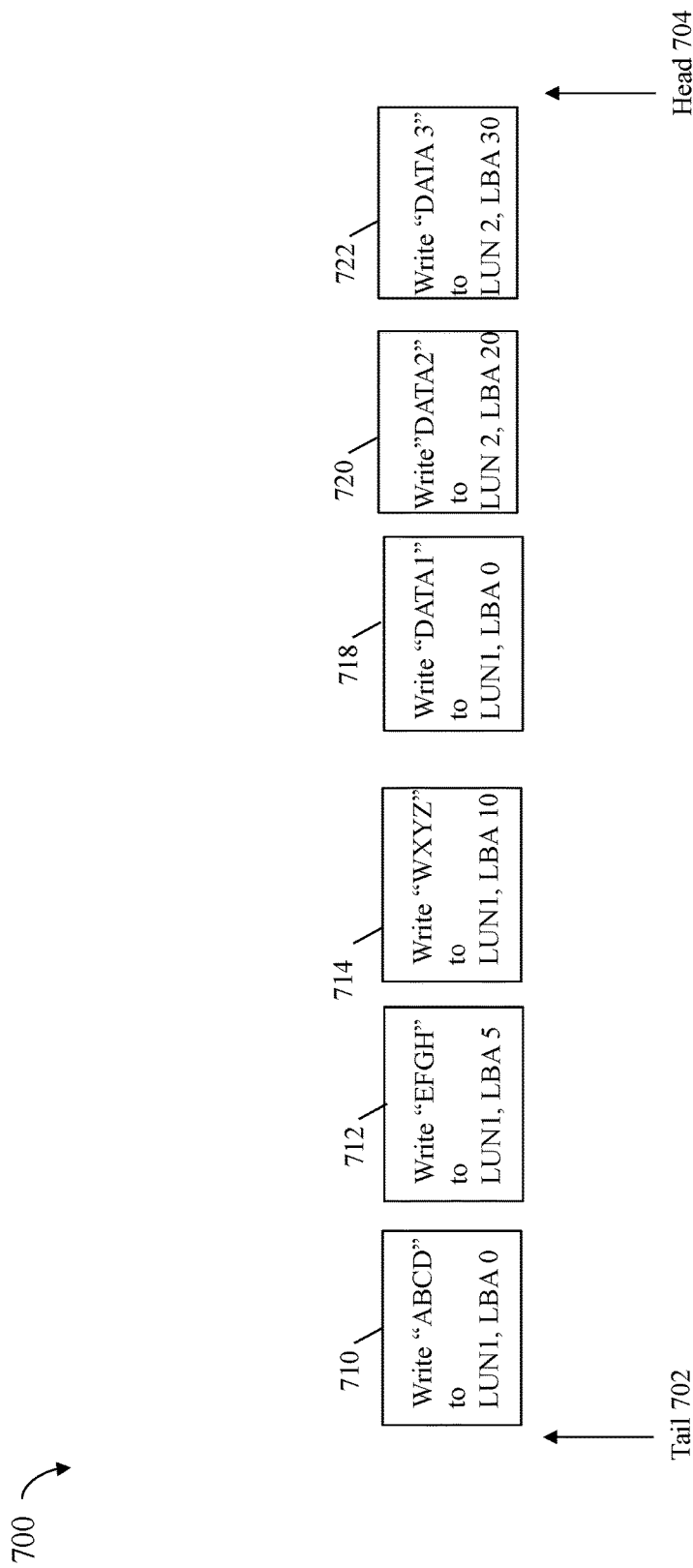

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
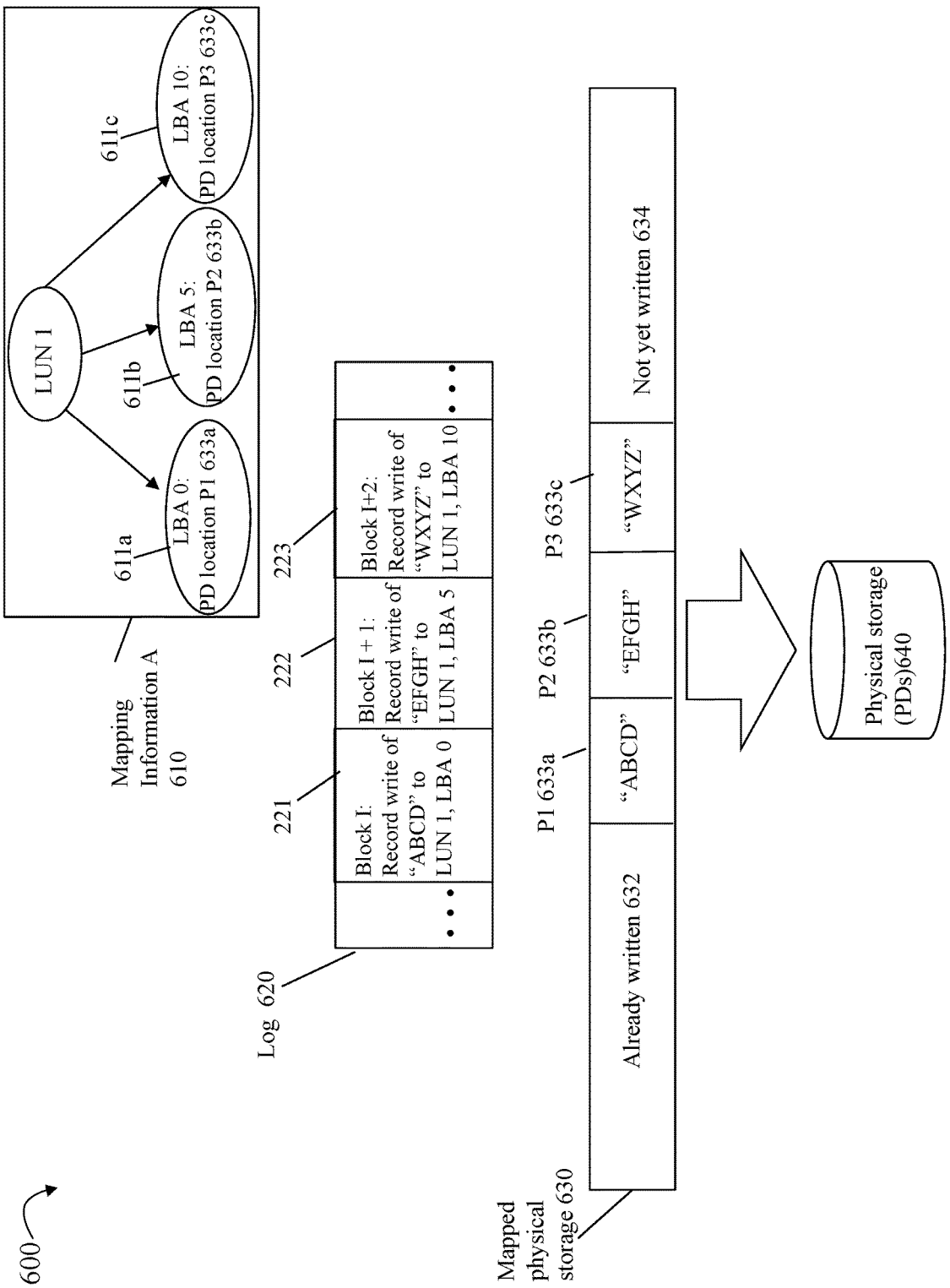

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
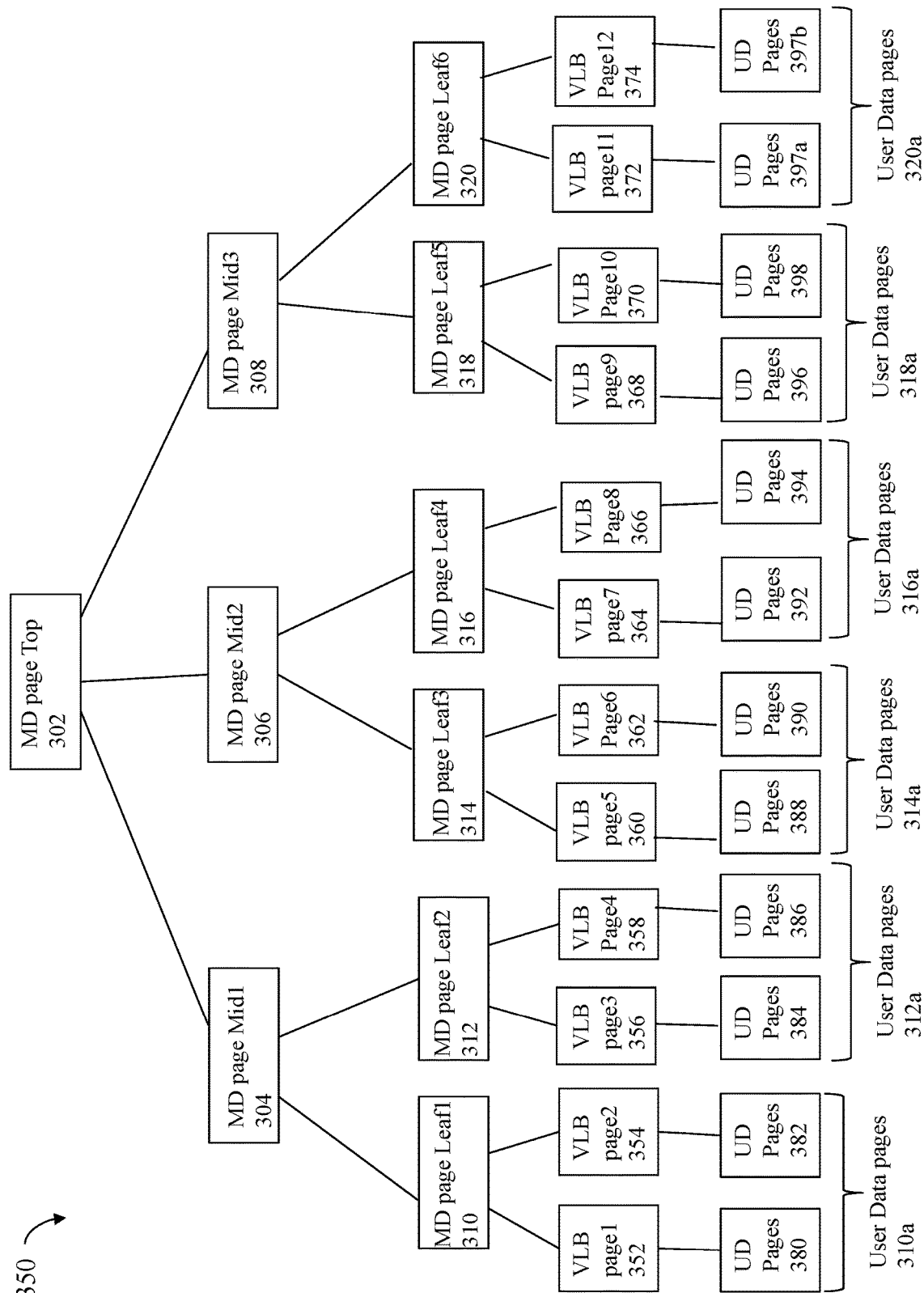

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages —MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
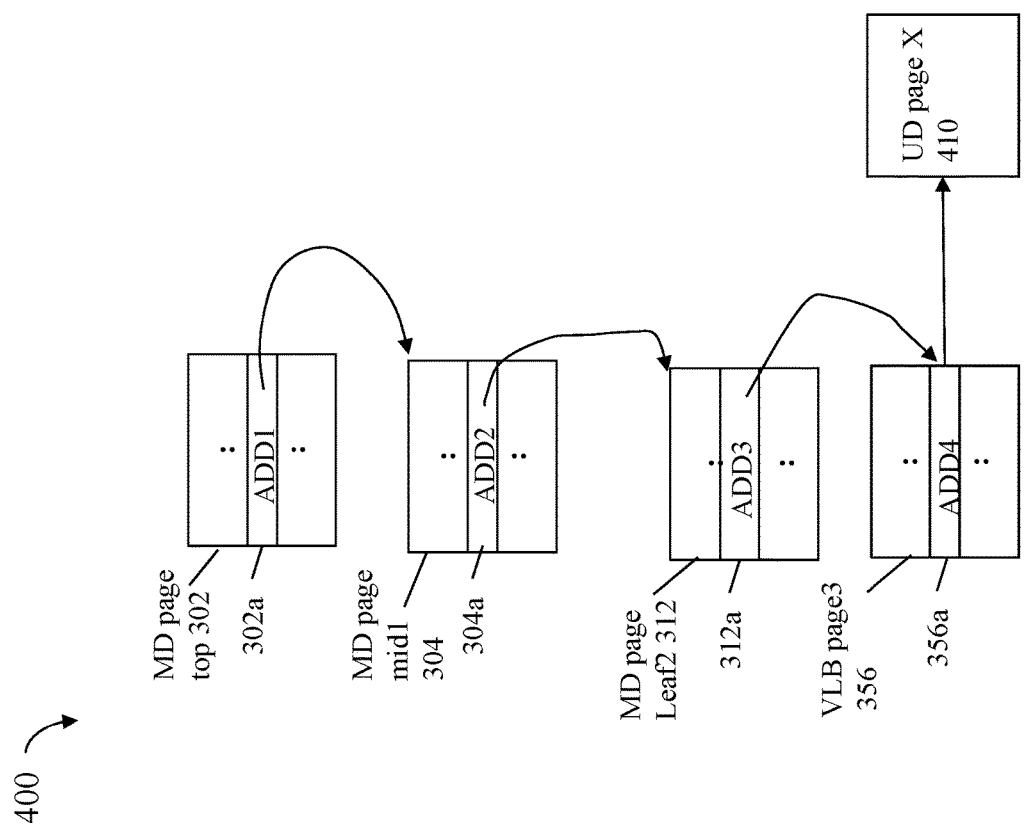

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. In at least one embodiment, the particular entry or offset 304*a* of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies the MD page leaf 2 312. If the MD page 312 is not already in cache, the on-disk copy of the MD page 312 on a PD can be read to obtain the content of location 312*a*. In at least one embodiment, the particular desired entry or offset 312*a* of the MD leaf2 page 312 can be determined based on the logical address being mapped. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
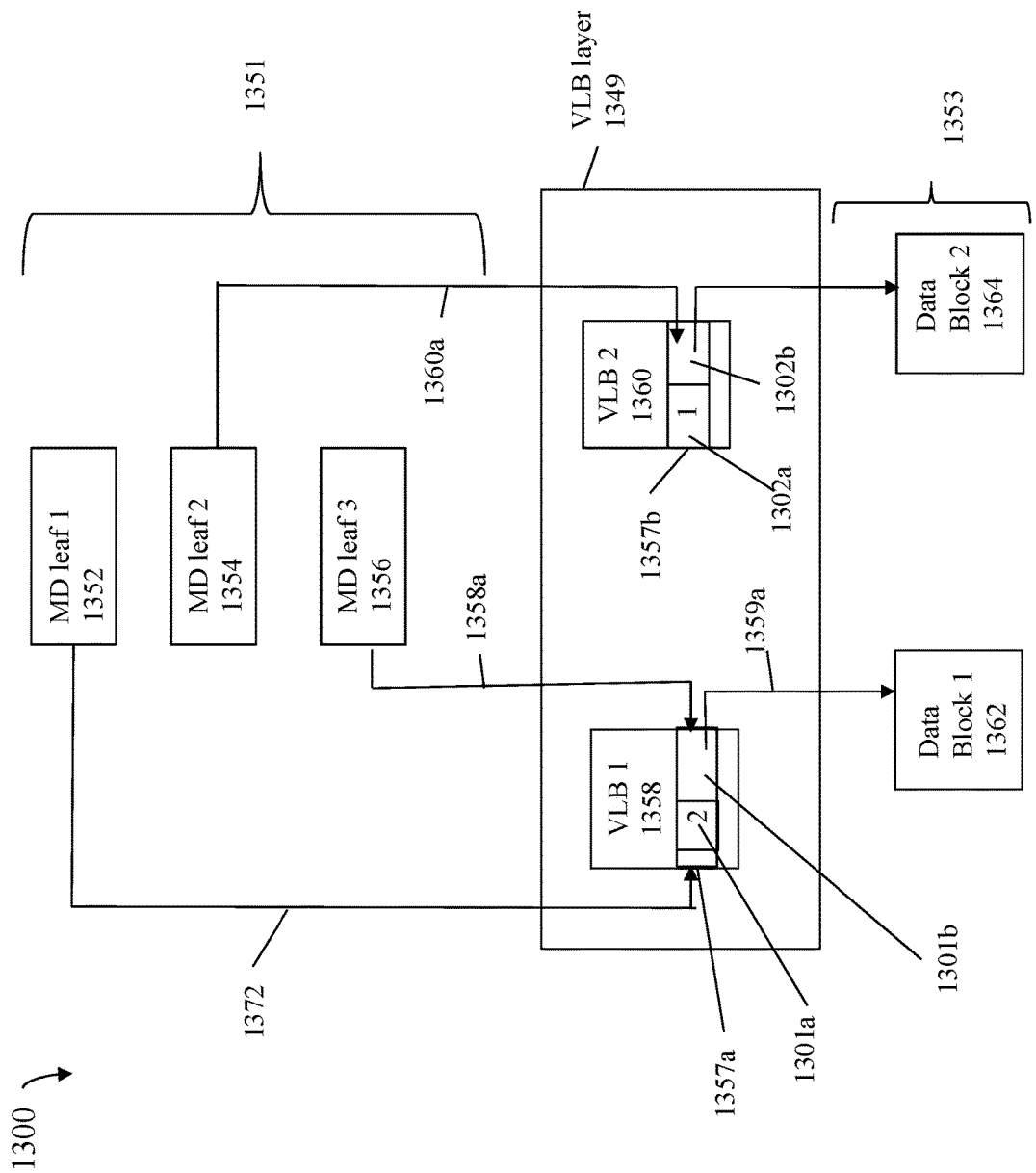

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In the example 1300, MD leaf node 1354 points to the entry 1357*b* of the VLB 1360 whereby the entry 1357*b* of the VLB2 1360 then further references or points to the data block 1364. The data blocks 1362, 1364 can denote user data blocks as described herein.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all duplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page. The mapping information can also include a VLB where a MD leaf page entry can reference a VLB entry, and the VLB entry can reference a physical location on BE non-volatile storage.

Described below are techniques of the present disclosure which provide for improved and efficient storage system performance by reducing read I/O latency.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address. The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of multiple nodes.

In at least one embodiment, the techniques of the present disclosure can provide for an improvement in I/O performance in a multiple node system where each of the multiple nodes of the system can receive I/Os and can service such received I/Os.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In connection with discussion herein, a node receiving an I/O operation, such as a read I/O, can sometimes be referred to as the initiator node with respect to the particular I/O operation received at the initiator node.

In at least one embodiment, when a read I/O directed to a logical address LA is received by a non-owner node that does not own LA, the non-owner initiator node can issue a request such as a remote procedure call (RPC) to the owner node to perform processing including resolution processing using mapping information of MD pages associated with the LA. The owner node can then perform resolution processing for LA using the mapping information to obtain a reference, address or pointer that can be used to access the content C1 stored at LA. In at least one embodiment, the reference, address or pointer used to access C1 can be an indirect pointer (IDP) used to access C1. The owner node of LA can return a response or reply to the non-owner initiator node where the response or reply can include the IDP, or more generally a hint or address hint. The non-owner initiator node can then use the IDP (or more generally use the hint or address hint) to access C1 from a physical storage location on BE non-volatile storage. The initiator node can then return C1 to the client that issued the read I/O.

Generally and consistent with other discussion herein, such an RPC and associated response or reply can be expected in about 50% of the I/Os in an active-active system where the I/Os can be received by two nodes of a dual node system. In the foregoing, the associated roundtrip time associated with the RPC and its associated response or reply can result in an additional latency penalty for about 50% of the I/Os which can adversely impact the average I/O latency even in cases where the system has a relatively low I/O workload. Such an adverse impact can be noticeable particularly for read I/Os due to the relative weight of the added round trip time associated with the RPC requests.

As a result in at least one embodiment, the techniques of the present disclosure can include the initiator node of a read I/O directed to LA, where the initiator node is not the owner of LA, also performing processing in parallel with sending the RPC request to the peer node that owns LA. The processing performed in parallel by the non-owner initiator node can include performing address resolution processing for LA locally. The local address resolution processing performed by the non-owning initiator node can result in possibly obtaining the wrong content or invalid content with respect to LA since LA is not owned by the initiator node. In at least one embodiment, local address resolution processing for LA performed by the non-owner initiator node can possibly obtain wrong or invalid content of LA, for example, due to updates made to associated metadata of the mapping information and/or content of LA where such updates can be made by the peer node that owns LA and where such updates can be unknown to the non-owner initiator node.

To avoid the foregoing in at least one embodiment, the local address resolution processing performed by the non-owner initiator node can result in obtaining a first IDP, or more generally, an address hint that can be used to access content C1 stored at LA from BE non-volatile storage. Additionally in at least one embodiment, the processing performed in parallel can include the non-owner initiator node using the first IDP to obtain C1 from BE non-volatile storage. However, the non-owner initiator node does not yet return C1 as obtained using the first IDP to the client. In at least one embodiment, the initiator node can wait until it receives the RPC reply from the peer node that owns LA, where the RPC reply can include a second IDP determined as a result of resolution processing for LA performed by the peer node that owns LA. The first IDP can be obtained by the non-owner initiator node using mapping information for LA and traversing at least a portion of the chain of MD pages corresponding to LA. As noted above in at least one embodiment, when the initiator node receives the read I/O directed to LA that it does not own, the initiator node can send a request, such as an RPC, to the owning peer node to perform address resolution processing for LA. The node which owns LA can perform address resolution processing using corresponding mapping information for LA. The address resolution processing performed by the owning node of LA can include the owning node using mapping information of MD pages and traversing a portion or at least some of the chain of MD pages to obtain the second IDP to the requested read data. In a response or reply to the RPC, the owning node can return the second IDP of the read data to the non-owner initiator node. The initiator node can wait to receive the RPC response and can compare the returned second IDP of the RPC response (returned from the owning node) to its local corresponding first IDP to determine whether the foregoing two IDPs match. If the foregoing two IDPs match, the non-owner initiator node can determine that its retrieved content C1 obtained using the first IDP for LA is valid, and can thereby return C1 for LA to the client in response to the read I/O. If the foregoing two IDPs do not match, the initiator node can determine that C1 as obtained using the first IDP for LA is invalid. In at least one embodiment in this latter case where the foregoing two IDPs do not match, the non-owner initiator node can perform processing including: using the returned second IDP from the owning node to read the current content C2 stored at LA from BE non-volatile storage; and returning the current content C2 for LA to the client in response to the read I/O. In at least one embodiment, it can be expected that the non-owner initiator node is able to retrieve C1 using the first IDP sooner than obtaining current content from BE non-volatile storage using the second IDP of the RPC response (e.g., since the non-owner initiator node must wait to receive the RPC response before it can read the current content using the second IDP of the RPC response). In this case, the processing performed in parallel by the non-owner initiator node can result in a reduced read I/O latency if the foregoing two IDPs match.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus, N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment, an address hint or more generally a hint can be used to access the physical storage location or address storing content for a particular logical address LA. In at least one embodiment, the hint can be an address, reference or pointer used to read the content for the LA from the physical storage location on BE non-volatile storage. In at least one embodiment, the hint can be an IDP used to read the content for the LA from the physical storage location on BE non-volatile storage. In at least one embodiment, the hint can be an address of, or pointer to, the physical storage location on BE non-volatile storage that contains the content for the LA.

In at least one embodiment resolution processing or address resolution processing for LA can use mapping information that includes a VLB page where a MD leaf page entry of the mapping information references a VLB entry of the VLB page, and the VLB entry can further reference a physical location on BE non-volatile storage. In at least one embodiment, the MD leaf page entry of the mapping information for LA can include the address of the VLB entry which further includes an address of a physical location on BE non-volatile storage of C1. In at least one embodiment, the IDP used as the address hint for C1 can be the address of the VLB entry which further includes the address of a physical location on BE non-volatile storage of C1. In further detail in at least one embodiment, address resolution processing performed by a node can include traversing a portion of the chain of MD pages of mapping information which maps LA to a corresponding physical address PA1 including C1 stored at LA. In particular in at least one embodiment, the resolution processing performed by the node traverses the chain of MD pages (e.g., MD top, MD mid, and MD leaf pages) until an entry E11 of a MD leaf is reached where E11 includes a VLB address, V1, which points to, or is an address of, an entry E12 of a target VLB, VLB1. In at least one embodiment, the VLB address V1 can be the IDP determined by the node as part of address resolution processing for LA. The same node or a different node can continue resolution processing for LA and can use the VLB address V1 to obtain a PLB address, PA1, where C1 is stored at PA1. In such an embodiment, resolution processing for LA can include using V1 to read entry E12 of VLB1, where E12 has the address, location or offset denoted by the VLB address V1. Entry E12 of VLB1 includes the PLB address PA1 whereby reading E12 includes reading PA1. PA1 can be used to read or access C1 stored at the address PA1 on BE non-volatile storage.

In at least one embodiment of the present disclosure for a read I/O directed to the logical address LA that is received by a node that does not own LA, a system can dynamically switch between performing optimized read I/O processing of the read I/O and regular or normal read I/O processing of the read I/O in accordance with one or more criteria. In at least one embodiment, the optimized read I/O processing can include the non-owner initiator node issuing the RPC for LA noted above to the peer owner node, and also in parallel, the initiator node locally performing processing for LA also noted above. In at least one embodiment, regular or normal read I/O processing can include the non-owner initiator node issuing the RPC to the peer owner node but can exclude the initiator node locally performing resolution processing for LA which it does not own. In at least one embodiment, regular or normal read I/O processing can include the non-owner initiator node using the hint, such as the IDP, included in the RPC response from the owning peer node to read the current content for LA from BE non-volatile storage, and returning the current content read to the client in response to the read I/O.

In at least one embodiment, the one or more criteria can include one or more metrics such as CPU utilization to decide whether to process a received read I/O using the optimized read I/O processing or regular or normal read I/O processing. In at least one embodiment, the optimized read I/O processing can include performing additional processing that is not performed in connection with normal or regular read I/O processing. In at least one embodiment, the additional processing can include extra opportunistic or optimistic processing performed by the non-owner initiator node including: local address resolution processing performed by the non-owner initiator node for LA to map LA to a corresponding IDP or address hint; and other processing to read content or data using the corresponding IDP or address hint locally determined by the non-owner initiator node. In at least one embodiment, one or more criteria can be used to evaluate the state of the system and decide whether to perform the optimized read I/O processing, and thus whether to perform the additional processing associated therewith. In at least one embodiment, the one or more metrics such as average CPU utilization can be used to evaluate the level of saturation or utilization of the system and its resources and determine whether the system has sufficient available resources to handle the additional processing of the optimized read I/O processing likely to reduce read latency. In at least one embodiment, the one or more criteria can specify to perform optimized read I/O processing, for example, if the current average CPU utilization of the system is below a specified threshold, and otherwise, performing regular or normal read I/O processing. More generally, in at least one embodiment, the one or more criteria can specify to perform optimized read I/O processing if the system has sufficient resources available, and otherwise, performing regular or normal read I/O processing.

The foregoing and other aspects of the techniques of the present disclosure are described in more detail in the following paragraphs.

Figure 7:
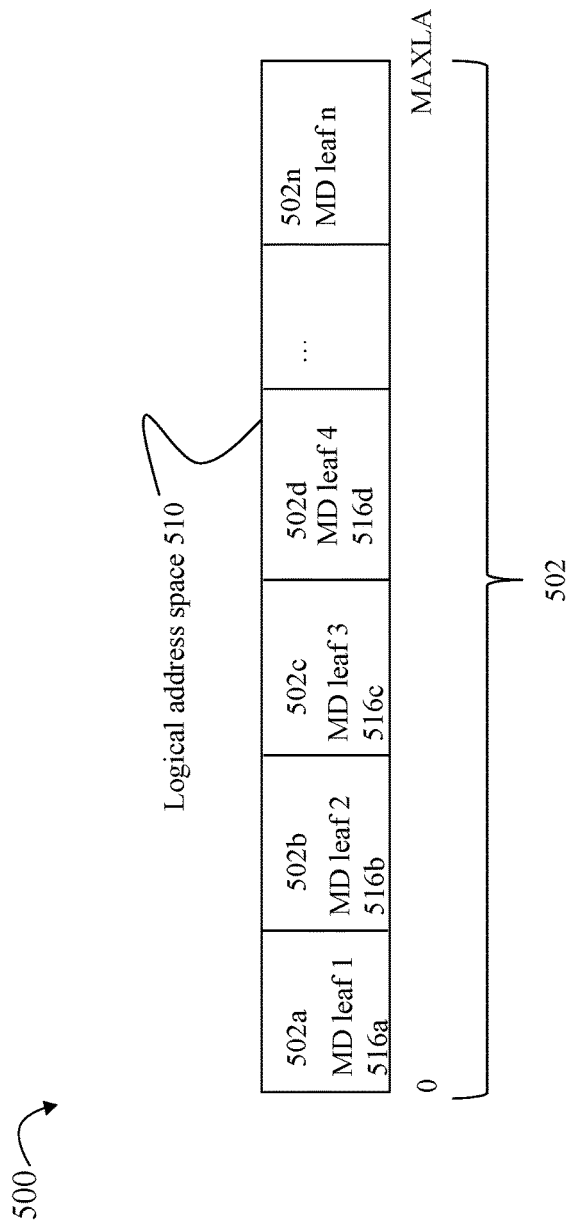
FIG. 7 is an example illustrating a partitioned logical address space in at least one embodiment in accordance with the techniques of the present disclosure.

Referring to FIG. 7, shown is an example 500 illustrating a partitioned logical address space into slices in at least one embodiment in accordance with the techniques of the present disclosure.

The example 500 includes the logical address space 510. The logical address space 510 can denote a contiguous logical address range such as of one or more volumes or LUNs.

In at least one embodiment in accordance with the techniques of the present disclosure, the user data (UD) logical address space 510 can be partitioned into multiple slices or portions 502, such as denoted by multiple logical address slices or portions 502a-n. Each of the logical address slices or portions 502a-n can be a same size, such as 2 MB (megabytes), or any other suitable size. In at least one embodiment, each logical address space portion or slice 502a-n can be 2 MB to correspond to the logical address subrange of each single MD leaf of the MD leaf layer 516. The multiple address space slices or portions 502a-n can then be divided among the two nodes such that a first of the nodes, such as node A, is assigned ownership of a first slice set of the logical address slices or portions 502; and a second of the nodes, such as node B, is assigned ownership of a second slice set of logical address slices or portions 502.

The logical address space 510 can denote an associated logical address space of any one or more storage objects or storage space. The one or more storage objects can include, for example, one or more volumes, logical devices or LUNs; one or more sub-volume or sub-LUN portions; one or more file systems; one or more files; one or more sub-file system portions (e.g., each file system portion being less than an entire file system); and/or one or more vvols or virtual volumes used by one or more virtual machines. Generally, the logical address space 510 can denote a contiguous range of consecutive logical addresses so that each of the logical address slices or portions 502a-n is mapped to a unique subrange of consecutive contiguous logical addresses of the logical address space 510. For example, consider an embodiment where each of the slices or logical address portions 502a-n is 2 MB in size. In this case, the slice 502a can include all logical addresses x in the subrange $0 \leq x < 2$ MB (e.g., (0-2 MB]); the portion 502*b* can include all logical addresses x in the subrange 2 MB≤x<4 MB (e.g., (2 MB-4 MB]); and so on.

The logical address slices or portions 502 can be partitioned into the two slice sets where each slice or logical address portion 502-*n* is included in only one of the two slice sets. In at least one embodiment, the logical address slices 502 can be partitioned equally as possible between the two nodes A and B although other unequal partitionings can also be suitable for use with the techniques of the present disclosure.

In at least one embodiment, the logical address slices of the contiguous logical address space 510 can alternate in connection with ownership assignment among the nodes A and B. In this manner, ownership of slices or portions of the logical address space 510 can be interleaved among the nodes A and B. For example with reference to FIG. 7 the slices 502*a-n* can correspond to consecutive contiguous logical address subranges of the logical address space 510, where 0 can denote the starting or lowest logical address of 510 and MAXLA can denote the ending or highest logical address of 510. Assuming each of the slices 502*a-n* is 2 MB and thus corresponds to a different MD leaf, the first 2 MB subrange (e.g., logical addresses (0 through 2 MB]) of 510 can correspond to the slice 502*a*; the second 2 MB subrange (e.g., logical addresses (2 MB through 4 MB]) of 510 can correspond to the slice 502*b*; the third 2 MB subrange (e.g., logical addresses (4 MB through 6 MB]) of 510 can correspond to the third slice 502*c*; the fourth 2 MB subrange (e.g., logical addresses (6 MB through 8 MB]) of 510 can correspond to the fourth slice 502*d*, and so on, for each slice in 510.

In at least one embodiment, each slice 502*a-n* can be assigned a corresponding unique slice identifier or ID which is an integer ID in a consecutive integer sequence corresponding to a relative position in a consecutive and contiguous ordering of the logical address subranges of the slices. For example, the slice 502*a* has an ID of "1", the slice 502*b* has an ID of "2", the slice 502*c* has an ID of "3", and so on, as the associated logical address subranges of the slices increase. In at least one embodiment, ownership of a slice of the logical address space 510 can be derived from or based on the relative consecutive ordering or placement of the slice itself. For example, as noted above, the owner of a logical address slice can be based on whether the slice has an associated even or odd slice ID. In at least one embodiment, all odd slices with odd slice IDs (e.g., slices 516*a*, 516*c*, and so on) can be included in a first slice set owned by node A, and all even slices with even slice IDs (e.g., slices 516*b*, 516*d*, and so on) can be included in a second slice set owned by node B.

Thus, each logical address of the logical address space or range 510 can be owned by a single one of the nodes A or B.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment for a given logical address LA, the owner node can cache the user data (UD) or content stored at the LA. In at least one embodiment, the owner node can also cache a corresponding IDP for the LA and UD or content stored at the LA. In at least one embodiment, caching of the corresponding IDP on the owner node can be optionally performed in accordance with the techniques of the present disclosure. In at least one embodiment, the cached IDP stored on the owner node can be included in the response to an RPC from the peer non-owner node rather than performing resolution processing of the associated LA to obtain the IDP which is included in the RPC response. Alternatively, if the owner node of LA does not cache the IDP along with the content stored at the LA, the owner node can perform resolution processing using the mapping information for LA to obtain its corresponding IDP which can be included in the RPC response.

In at least one embodiment where the owner node can cache both content and an IDP corresponding to an LA, the owner node's cache may either include both the content and IDP for a corresponding LA, or may otherwise include neither the content nor the IDP for LA. As a variation the owner node can separately and independently maintain a first cache of content stored at logical addresses (where the first cache can be indexed by logical addresses) and second cache of IDPs corresponding to logical addresses (where the second cache can be indexed by logical addresses). In such an embodiment where the first and second caches of an owner node are maintained independently possibly using different caching policies and having different number of entries, it can be possible for a LA of an owner node to have corresponding information cached in only one of the two caches depending on the particular caching policies, sizes and/or other characteristics. In this latter scenario, it is straightforward to one of ordinary skill in the art to further modify or extend the processing and techniques described herein to apply to the latter scenario.

In at least one embodiment, the IDP for LA can be a pointer or reference to, or an index or address of, a VLB entry of a VLB. The VLB entry can further include an address of, or a pointer to, a PLB (physical layer or large block) on BE non-volatile storage where the content of the LA is stored. More generally, the IDP can be characterized as, or can denote, a hint or address hint used to obtain or access content stored at a corresponding LA associated with the IDP.

In at least one embodiment, the IDP for a logical address can be a pointer or reference to, or an index or address of, a VLB entry as noted above. As a variation rather than use an IDP such as a pointer to, or address of, a VLB entry, an embodiment can more generally use other suitable types of hints where such a hint can be used to access or obtain valid current content stored at the logical address. For example, in at least one embodiment, the hint for a logical address can be a pointer to the PLB of BE non-volatile storage storing the current valid content for the logical address.

In examples and discussion below, embodiments can be described where a node is allowed to cache content for logical addresses owned by the node. Thus although following discussion may assume that an owner node of a logical address caches content for the logical address but may or may not cache a corresponding IDP, the owner node of a logical address can also optionally cache an IDP corresponding to the cached content stored at the logical address. It is straightforward to one of ordinary skill in the art to further modify the processing and techniques described herein to apply to the owner node also caching IDPs, or other suitable addresses or pointers used as hints in connection with validating associated cached content for a logical address.

Before describing processing that can be performed in connection with optimized read I/O processing as performed by a node that receives the read I/O directed to a logical address LA but where the node does not own LA, owner node read I/O processing and non-owner node normal or regular read I/O processing is first described in the following paragraphs.

What will now be described is owner node read I/O processing when the owner node receives the read I/O and is thus the initiator with respect to the read I/O in at least one embodiment in accordance with the techniques of the present disclosure. In at least one embodiment, UD or content stored at a LA can be cached on an owner node of the LA when the owner node reads the UD or content stored at the LA from BE non-volatile storage using mapping information of MD pages corresponding to the LA.

In at least one embodiment, when the owner node of LA receives a read for LA whereby the owner node is also the initiator node for LA of the read I/O, the owner node can perform read I/O processing that includes determining whether the content C1 for LA is stored in the data cache of the owner node. If the content C1 for LA is stored in the cache of the owner node thereby resulting in a cache hit, the owner node can return the cached content C1 for LA in response to the read I/O. Alternatively, if the content C1 for LA is not stored in the cache of the owner node thereby resulting in a cache miss, the owner node can: 1) perform resolution processing using the mapping information of the chain of MD pages to obtain the IDP for LA; 2) use the IDP to read content C1 stored at LA from the BE non-volatile storage; 3) cache the content C1 (just read from BE non-volatile storage) and IDP corresponding to LA in its node local cache; and 4) return the content C1 for LA in response to the read I/O.

Thus, in at least one embodiment, when the node that receives the read I/O directed to LA is also the owner, the node can be characterized as both the initiator and the owner with respect to the LA. In at least one embodiment for a node that is both the initiator and the owner with respect to the LA of a read I/O, if the read I/O processing results in a read cache miss with respect to the content of LA not being stored in the initiator node's cache, the node reads the corresponding content from the BE PDs and can cache the content for LA along with the corresponding IDP.

Figure 8:
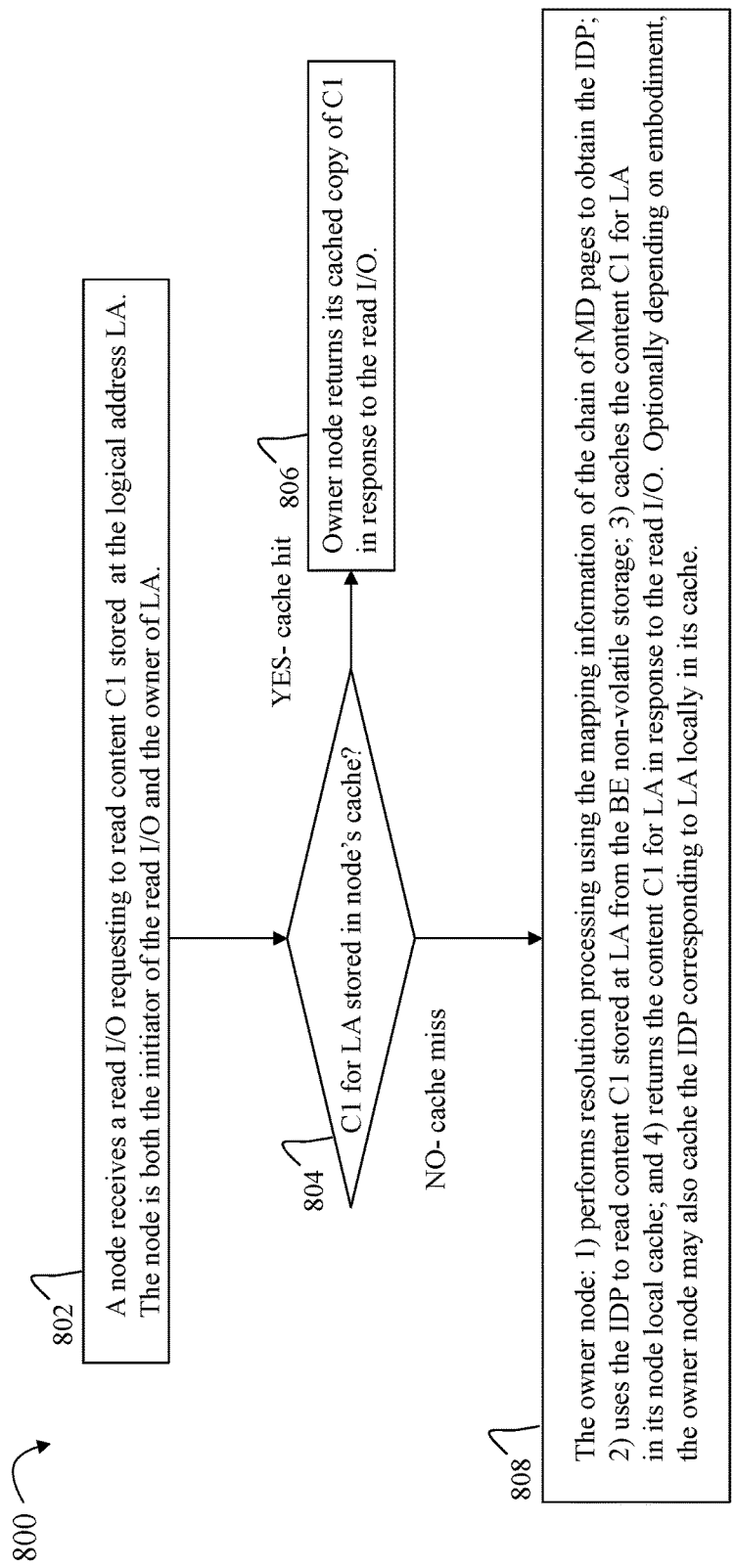
FIGS. 8, 9, 10A, 10B, and 11 are flowcharts of processing steps that can be performed in at least one embodiment in accordance with the techniques of the present disclosure.

Referring to FIG. 8, shown is a flowchart 800 summarizing processing that can be performed by an owner node of a logical address LA when the owner node receives a read I/O directed to LA in at least one embodiment in accordance with the techniques of the present disclosure. The flowchart 800 summarizes owner node read I/O processing discussed above in at least one embodiment.

At the step 802, a node receives a read I/O requesting to read content C1 stored at the logical address LA. The node is both the initiator of the read I/O and the owner of LA. From the step 802, control proceeds to the step 804.

At the step 804, a determination can be made as to whether C1 for LA is stored in the initiator owner node's cache. If the step 804 evaluates to yes thereby denoting a cache hit with respect to C1 for LA in the initiator owner node's cache, control proceeds to the step 806. In the step 806, the owner node can return its cached copy of C1 in response to the read I/O.

If the step 804 evaluates to no thereby denoting a cache miss with respect to C1 for LA in the initiator owner node's cache, control proceeds to the step 808. At the step 808, the owner node: 1) performs resolution processing using the mapping information of the chain of MD pages to obtain the IDP corresponding to LA; 2) uses the IDP to read content C1 stored at LA from the BE non-volatile storage; 3) caches the content C1 for LA in its node local cache; and 4) returns the content C1 for LA in response to the read I/O. Optionally depending on embodiment, the owner node may also cache the IDP corresponding to LA locally in its cache.

What will now be described is non-owner node normal or regular read I/O processing where the non-owner node of LA receives the read I/O directed to LA and is thus the initiator with respect to the read I/O in at least one embodiment in accordance with the techniques of the present disclosure.

Figure 9:
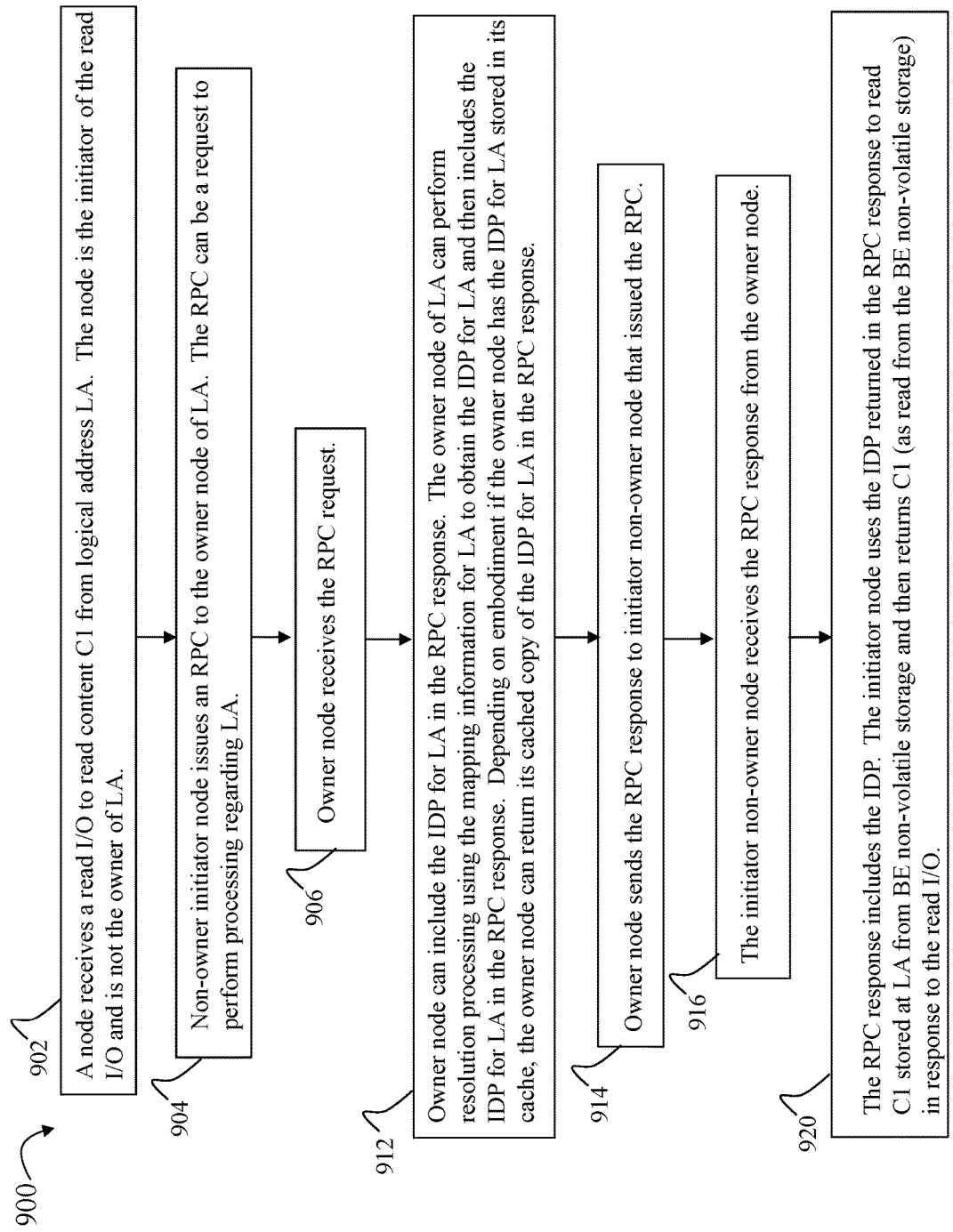

Referring to FIG. 9, shown is a flowchart 900 summarizing normal or regular read I/O processing that can be performed by a non-owner node of a logical address LA when the owner node receives a read I/O directed to LA in at least one embodiment in accordance with the techniques of the present disclosure.

At the step 902, a node receives a read I/O to read content C1 from logical address LA. The node is the initiator of the read I/O and is not the owner of LA. From the step 902, control proceeds to the step 904.

At the step 904, the non-owner initiator node can issue an RPC to the owner node of LA. The RPC can be a request to perform processing regarding LA. Following the step 904, the owner node of LA receives the RPC request in the step 906. Following the step 906 is a step 912.

At the step 912, the owner node can include the IDP for LA in a response to the RPC. In the step 912, the owner node of LA can perform resolution processing using the mapping information for LA to obtain the IDP for LA and then includes the IDP for LA in the RPC response. Depending on embodiment if the owner node has the IDP for LA stored in its cache, the owner node can return its cached copy of the IDP for LA in the RPC response. From the step 912, control proceeds to the step 914.

At the step 914, the owner node can send the RPC response to the non-owner initiator node that issued the RPC. From the step 914, control proceeds to the step 916.

At the step 916, the non-owner initiator node receives the RPC response from the owner node. From the step 916, control proceeds to the step 920.

At the step 920, the RPC response includes the IDP corresponding to LA. In the step 920, the initiator node uses the IDP returned in the RPC response to read C1 stored at LA from BE non-volatile storage and then returns C1 (as read from the BE non-volatile storage) in response to the read I/O.

What will now be described is an optimized variant of non-owner read I/O processing, also sometimes referred to herein as optimized read I/O processing or non-owner optimized read I/O processing, for such read I/Os requesting to read content from logical addresses that are not owned by the initiator node in at least one embodiment in accordance with the techniques of the present disclosure.

The non-owner optimized read I/O processing allows for reduced latency of non-owner read I/Os while guaranteeing data consistency. In at least one embodiment, the non-owner optimized read I/O processing includes performing double mapping resolution processing of a logical address LA of a read I/O. The initiator node does not own LA. The initiator node, in parallel with sending an RPC request to the peer node that owns LA, can also perform resolution processing for LA locally.

In at least one embodiment, the locally performed resolution processing for LA can possibly result in obtaining invalid content for LA since the initiator node does not own LA. The initiator node can read first content C1 based on local resolution processing that includes traversing the chain of MD pages of mapping information for LA. The local resolution processing can use mapping information that includes a VLB page where a MD leaf page entry of the mapping information references a VLB entry of the VLB page, and the VLB entry can further reference a physical location on BE non-volatile storage. In at least one embodiment, the MD leaf page entry of the mapping information for LA can include the address of the VLB entry which further includes an address of a physical location on BE non-volatile storage of C1. In at least one embodiment, the IDP used as the address hint for C1 can be the address of the VLB entry which further includes the address of a physical location on BE non-volatile storage of C1.

In further detail in at least one embodiment, the local resolution processing performed by the initiator node can traverse a portion of the chain of MD pages of mapping information which maps LA to a corresponding physical address PA1 including C1 stored at LA. In particular in at least one embodiment, the local resolution processing performed by the initiator node traverses the chain of MD pages until an entry E11 of a MD leaf is reached where E11 includes a VLB address, V1, which points to, or is an address of, an entry E12 of a target VLB, VLB1. In at least one embodiment, the VLB address V1 can be the IDP determined by the initiator node using local resolution processing. The initiator node can continue local resolution processing and can use the VLB address V1 to obtain a PLB address, PA1, where C1 is stored at PA1. Processing can include using V1 to read entry E12 of VLB1, where E12 has the address, location or offset denoted by the VLB address V1. Entry E12 of VLB1 includes the PLB address PA1 whereby reading E12 includes reading PA1. PA1 can be used to read or access C1 stored at the address PA1 on BE non-volatile storage.

At this point, the initiator node does not know whether the IDP used to access C1 is valid and also does not know whether the content C1 is valid content stored at LA. Accordingly, the initiator node does not yet return C1 to the client in response to the read I/O. The initiator node waits for a response to the RPC to be returned by the peer node that owns LA where the RPC response includes IDP2. IDP2 denotes the IDP or hint obtained by the peer node performing resolution processing for LA using corresponding mapping information for LA in response to receiving the RPC request. In response to receiving the RPC request, the owner peer node uses mapping information that includes a VLB page where a MD leaf page entry of the mapping information references a VLB entry of the VLB page, and the VLB entry can further reference a physical location on BE non-volatile storage. IDP2 can be the address of the VLB entry as determined by the resolution processing performed by the peer node that owns LA. Such resolution processing performed by the owner peer node can include traversing the chain of MD pages including a MD top page, a MD mid page, and a MD leaf page. In further detail in at least one embodiment, the resolution processing performed by the owner node of LA can traverse a portion of the chain of MD pages of mapping information which maps LA to a corresponding physical address PA1 including C1 stored at LA. In particular in at least one embodiment, the owner node resolution processing can traverses the chain of MD pages until an entry E41 of a MD leaf is reached where E41 includes a VLB address, V4, which points to, or is an address of, an entry E42 of a target VLB, VLB4. In at least one embodiment, the VLB address V4 can be the IDP2 determined by the owner node's resolution processing corresponding to LA. Since the peer node owns LA, the owning node of LA can be guaranteed to use current valid MD and VLB pages and mapping information for LA. In contrast, any of the MD and/or VLB pages and/or mapping information for LA used by the non-owner initiator node can be invalid. Accordingly, the non-owner initiator node can compare its IDP (as determined using its local resolution processing) to IDP2 (as returned in the RPC response from the owner peer node). If the foregoing two IDPs match, the non-owner initiator node can determine that its pre-read content C1 (obtained using its local IDP) is valid and can be returned to the client in response to the read I/O. If the foregoing two IDPs match, there is no additional waiting to retrieve content using IDP2. However, if the foregoing two IDPs do not match, it means that the local IDP and corresponding content C1 determined by the non-owning initiator node are invalid. In response to determining the foregoing two IDPs do not match, the non-owning initiator node can use IDP2 of the RPC response to read current content C2 from BE non-volatile storage, and then return C2 to the client in response to the read I/O. In at least one embodiment continuing with the above example, in response to determining the foregoing two IDPs do not match, further detail regarding processing performed by the non-owning initiator node can include the initiator node using the VLB address V4 (as denoted as IDP2) to obtain a PLB address, PA2, where C2 is stored at PA2. Processing can include using V4 (e.g., IDP2) to read entry E42 of VLB4, where E42 has the address, location or offset denoted by the VLB address V4. Entry E42 of VLB4 includes the PLB address PA2 whereby reading E42 includes reading PA2. PA2 can be used to read or access C2 stored at the address PA2 on BE non-volatile storage.

Figure 10A:
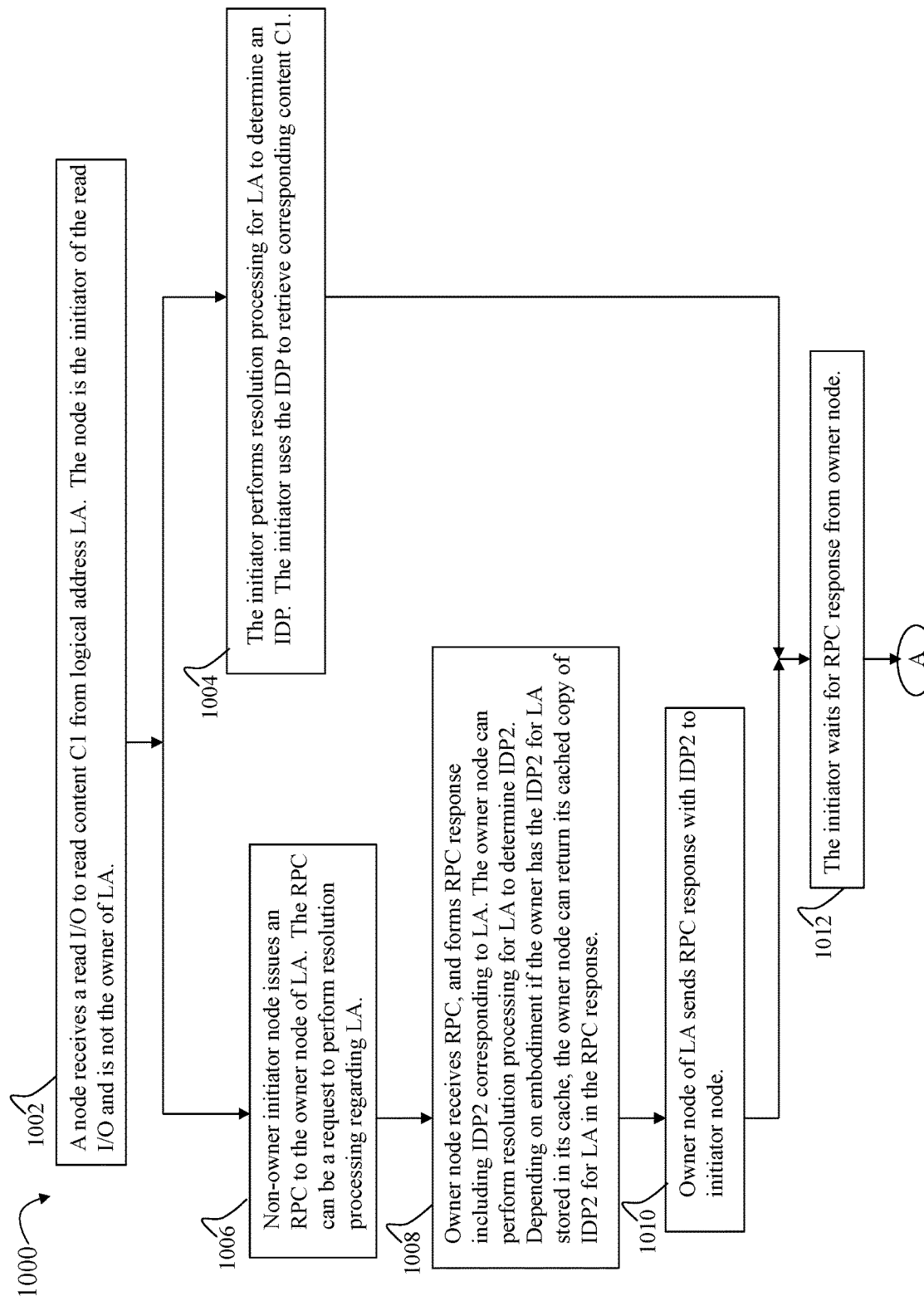
Figure 10B:
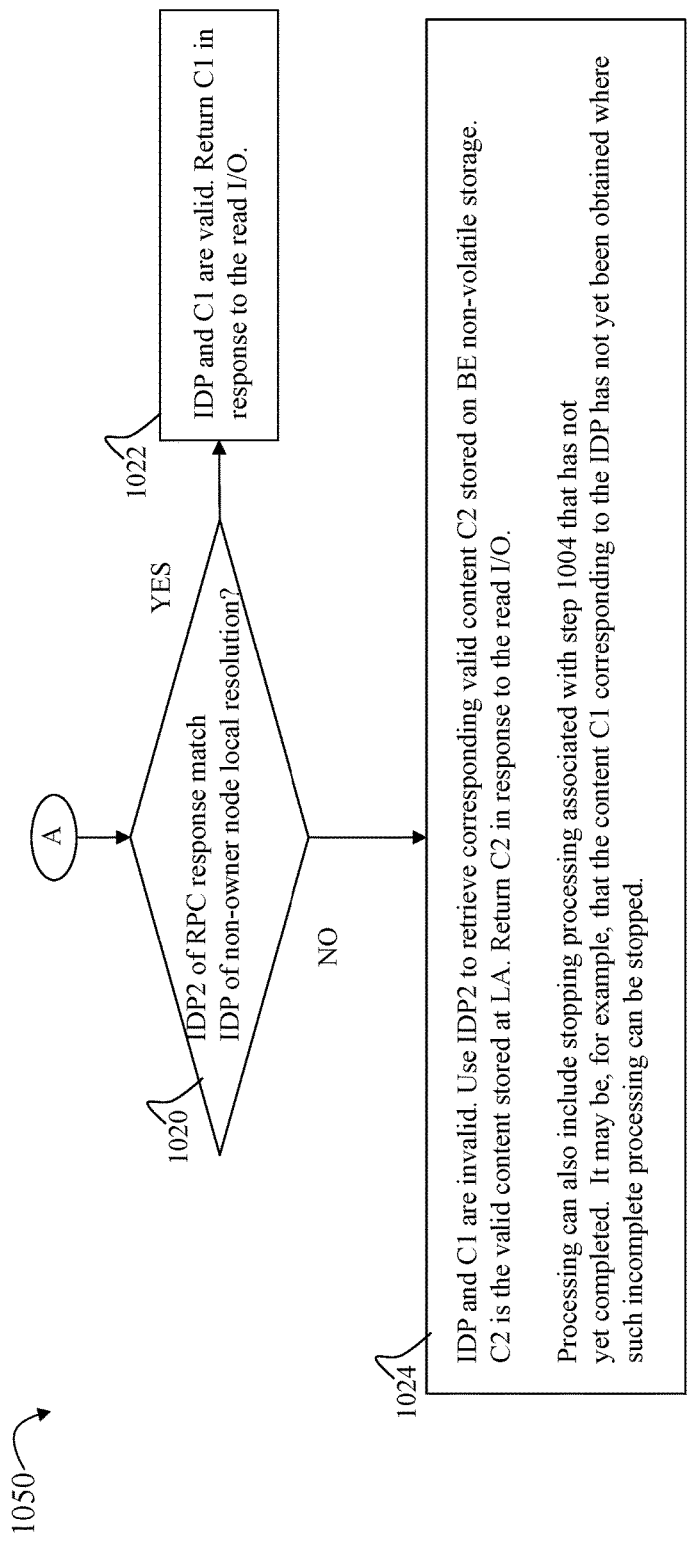

Referring to FIG. 10, shown is a flowchart 1000 summarizing optimized read I/O processing that can be performed by a non-owner node of a logical address LA when the owner node receives a read I/O directed to LA in at least one embodiment in accordance with the techniques of the present disclosure. FIG. 10 summarizes processing discussed above.

At the step 1002, a node receives a read I/O to read content C1 from logical address LA. The node is the initiator of the read I/O and is not the owner of LA. At this point in at least one embodiment, processing can be performed that includes two parallel execution streams. A first execution stream can include the steps 1006, 1008 and 1010 and relates to owner node address resolution processing for LA. A second execution stream can include the step 1005 and includes the non-owner initiator node performing address resolution processing for LA and obtaining the contents based on such local address resolution processing for LA as performed by the non-owner initiator node. The foregoing first and second execution streams can be performed in parallel in at least one embodiment in accordance with the techniques of the present disclosure. Subsequently in at least one embodiment, processing of the first and second execution streams can join at the step 1012 where processing of the initiator can wait for an RPC response from the owner node in response to the RPC request issued in the step 1006 discussed in more detail below.

Following the step 1002, the foregoing first and second execution streams can be performed in parallel in at least one embodiment. For the first execution stream, control proceeds from the step 1002 to the step 1006. At the step 1006, the non-owner initiator node issues an RPC to the peer owner node that owns LA. The RPC can be a request that the owner node of LA perform resolution processing for LA. From the step 1006, control proceeds to the step 1008.

At the step 1008, the owner node receives the RPC and forms an RPC response including the indirect pointer IDP2 corresponding to LA. The owner node can perform resolution processing for LA to determine IDP2. The resolution processing for LA can include traversing at least a portion of the chain of MD pages of mapping information that maps LA to a corresponding physical storage location on BE non-volatile storage that includes content stored at LA. Depending on embodiment if the owner has the IDP2 for LA stored in its cache, the owner node can return its cached copy of IDP2 for LA in the RPC response. From the step 1008, control proceeds to the step 1010.

At the step 1010, the owner node that owns LA sends the RPC response with IDP2 to the non-owner initiator node. From the step 1010, control proceeds to the step 1012 where the initiator node waits to receive the RPC response from the owner node before proceeding to the subsequent step 1020.

For the second execution stream, control proceeds from the step 1002 to the step 1004. At the step 1004, the non-owner initiator node performs resolution processing for LA to determine a corresponding IDP. The initiator node can then use its corresponding IDP to retrieve corresponding content C1. The resolution processing for LA as performed locally by the initiator node can include traversing at least a portion of the chain of MD pages of mapping information that maps LA to a corresponding physical storage location on BE non-volatile storage that includes content stored at LA. In at least one embodiment, it should be noted that resolution processing performed locally by the non-owner initiator node for LA is not guaranteed to be reliable in that, for example, the owner node may have performed one or more updates to one or more of a MD page of the chain and/or updated contents stored at LA where the non-owner initiator node may not be aware of such updates or changes. For example, in at least one embodiment, the non-owner node and the owner node of LA can each use a different version of a MD leaf page in their address resolution processing for LA. In particular, the corresponding MD leaf entry associated with LA as used by the owner node can have a first IDP that is an address or pointer to a first VLB entry, and the corresponding MD leaf entry associated with LA as used by the owner node can have a second IDP that is an address or pointer to a second VLB entry, where the first and second IDPs are different. Such a difference between the first and second IDPs can be the result, for example, of race conditions or other conditions where updates can be made to the MD leaf page entry by the owner node of LA. As a result in connection with the foregoing, any content obtained using an IDP obtained as a result of address resolution processing performed by a non-owner node of LA has the possibility of referencing invalid or inconsistent content not actually stored at LA. However alternatively such content obtained using an IDP obtained as a result of address resolution processing performed by a non-owner node of LA also can possibly be valid consistent content stored at LA. In at least one embodiment, it can be guaranteed that the owner node of LA always performs consistent and reliable address resolution processing for LA such that the second IDP determined by the owner node can always be used to access the current valid content stored at LA. As a result, the second execution stream where the non-owner node of LA performs its own local address resolution for LA may or may not result in retrieving the correct, current valid content stored at LA. In at least one embodiment, processing performed in subsequent steps of FIG. 10B can check and validate the corresponding IDP determined locally in the step 1004 by the non-owner node performing resolution processing for LA, where if the corresponding IDP determined by the non-owner node's local resolution processing is valid, then the corresponding content C1 retrieved using the IDP is also the current valid content of LA. From the step 1004, control proceeds to the step 1012.

It should be noted that in some instances, all the processing of the step 1004 may not have yet completed when the RPC response from the owner node is received in the step 1012 by the non-owner initiator node. In such instances, processing of steps subsequent to the step 1012 can proceed when possible as processing of the step 1004 is completed where such steps subsequent to the step 1012 depend upon particular processing of the step 1004 being complete. For example, the step 1020 discussed below uses the corresponding IDP determined locally by the resolution processing for LA performed by the initiator node in the step 1004. Thus, the step 1020 discussed below cannot proceed until the IDP of the step 1004 is determined. As another example, the step 1022 discussed below uses the corresponding content C1 retrieved using the IDP of the step 1004. As a result, the step 1022 cannot be performed until the IDP and C1 of the step 1004 are determined.

From the step 1012, control proceeds to the step 1020. At the step 1020, the initiator node can perform processing to determine whether the IDP2 of the RPC response matches the IDP as determined in the step 1004 by the non-owner node local resolution processing for LA. If the step 1020 evaluates to yes whereby the IDP and IDP2 match, control proceeds to the step 1022.

At the step 1022, the initiator node determines that its corresponding IDP and C1 are valid with respect to LA. In the step 1022, the initiator node returns C1 in response to the read I/O.

If the step 1020 evaluates to no whereby the IDP and IDP2 do not match, control proceeds to the step 1024. At the step 1024, the initiator node determines that its corresponding IDP and C1 are invalid with respect to LA. However, IDP2 as determined by the owner node of LA and returns in the RPC response is valid with respect to LA. In the step 1024, the initiator node can use IDP2 (as returned in the RPC response) to retrieve corresponding valid content C2 stored on BE non-volatile storage. In this case, C2 (but not C1) is the valid content stored at LA. In the step 1024, the initiator node can return C2 in response to the read I/O.

In at least one embodiment, the step 1024 can also include stopping processing associated with step 1004 that has not yet completed. It may be, for example, that the content C1 corresponding to the IDP has not yet been obtained whereby such associated processing of the step 1004 can be stopped.

Following are some items that can be noted about performing the optimized read I/O processing as performed by the non-owner node of a LA in at least one embodiment in accordance with the techniques of the present disclosure.

In at least one embodiment, the probability of an occurrence when address resolution processing for a LA performed by a non-owner of LA results in retrieving corresponding content that is invalid can be very low so that the overall adverse impact of such an occurrence can be characterized as negligible or insignificant.

In at least one embodiment, the optimized read I/O processing as performed by a non-owner node with respect to LA can result in a successful optimistic or opportunistic reading of the valid content of LA prior to obtaining the RPC response from the peer node that owns LA in a vast majority of cases. Therefore in such an embodiment, the optimized read I/O processing can be expected result in a lower read I/O latency for such non-owner initiator read I/Os since the valid content of LA can be optimistically or opportunistically acquired without having to wait to retrieve the valid content of LA using a hint or IDP, such as IDP2, of the RPC response from the owner node of LA. As a result, use of the optimized read I/O flow for a non-owner node with respect to LA can result in achieving similar read I/O read latency in cases where the initiator of the read is the owner of LA and where the initiator of the read is not the owner of LA. From the other side, the optimized read I/O processing generally consumes additional resources, such as additional CPU resources) since the address resolution processing is performed twice (e.g., in the first execution stream by the owner node of LA, and in the second execution stream by the initiator node that does not own LA). In some instances in at least one embodiment, use of the optimized read I/O processing can also reduce caching efficiency, such as reduce MD page cache hit rate, with respect to cached MD pages. As a result, selecting to have a non-owner node initiator node of an LA perform optimized read I/O processing or alternatively normal or regular read I/O processing for a read I/O directed to LA can be a balancing of reduced read I/O latency versus expending additional resources for other purposes such as additional I/O workload.

In at least one embodiment in accordance with the techniques of the present disclosure, a system can choose to have all read I/Os received by a non-owner initiator node processing using the optimized read I/O processing.

Alternatively, in at least one embodiment, the optimized read I/O processing performed by a non-owner initiator node described herein and also normal or regular read I/O processing performed by a non-owner initiator node described herein can be supported. In at least one embodiment supporting both optimized read I/O processing performed by a non-owner initiator node and also normal or regular read I/O processing performed by a non-owner initiator node, processing can be performed to dynamically switch between or select a particular one of the foregoing to be in effect at various points in time based, at least on in part, on the current state of the system.

In at least one embodiment, a dynamic or adaptive evaluation can be performed at various points in time, such as periodically and/or in response to one or more specified conditions occurring, to select either optimized read I/O processing or normal read I/O processing to be utilized and applied in connection with a read I/O that reads content from a logical address LA where the read I/O is received by an initiator node that does not own LA. In at least one embodiment, the dynamic evaluation can be based, at least in part, on one or more dynamic evaluation criteria that can change during runtime of the system. Thus, as conditions specified in the dynamic evaluation criteria can change over time, so can the particular selected method or technique that is utilized and applied. In at least one embodiment, the system can be initially configured at boot up or startup to use a default or a particular one of the optimized or normal read I/O processing. Periodically, the one or more dynamic evaluation criteria can be evaluated to determine whether current conditions in the system trigger a switch or change in the selected method or technique applied in the system.

In at least one embodiment, the dynamic evaluation criteria can include one or more metrics regarding CPU utilization, such as average CPU utilization or normalized I/O core saturation of the system. For example, the dynamic evaluation criteria can include an average CPU utilization denoting a percentage of the total CPUs or processing cores of the system. If, for example, the CPU utilization is above a threshold and the system is currently applying optimized read I/O processing, the system can be configured to switch to normal read I/O processing. If, for example, the CPU utilization is at or below the threshold and the system is currently applying normal read I/O processing, the system can be configured to switch from to optimized read I/O processing.

In at least one embodiment, the dynamic evaluation criteria can be based, at least in part, on whether one or more system resources are saturated or above a specified threshold level of utilization. In at least one embodiment, the dynamic evaluation criteria can be based, at least in part, on one or more cache-related metrics such as cache utilization, one or more metrics regarding BE resource consumption, one or more metrics regarding metadata efficiency, and/or one or more metrics regarding CPU resource consumption. For example in at least one embodiment, the dynamic evaluation criteria can be based, at least in part, on one or more cache-related metrics such as cache utilization (e.g., an average cache utilization denoting a percentage of the total amount or size of the data cache that is allocated or consumed for storing user data or content); one or more BE resource consumption metrics such as BE disk utilization, BE controller utilization, and/or BE I/O workload; one or more metrics regarding CPU or processor core resource consumption such as CPU utilization or processor core utilization; and/or one or more metrics regarding metadata cache efficiency such as regarding an average cache hit rate for cached metadata pages used in connection with mapping information for logical addresses. In at least one embodiment, the cache hit rate related to metadata pages can be collectively based on caching performed across multiple nodes of the system since, for example, use of optimized read I/O processing can reduce MD cache efficiency since both nodes (owner and non-owner with respect to logical addresses) can now be caching the same MD pages used for mapping the same logical addresses. In at least embodiment, the criteria can indicate to switch from optimized read I/O processing to normal read I/O processing if the MD page cache hit rate across the two nodes is below a specified threshold. The foregoing can be included in connection with one or more other criteria. If for example the system is currently applying normal read I/O processing and the cache utilization is below a threshold and the system has at least a threshold amount of available or free BE resources (e.g., BE disk utilization, BE controller utilization and BE I/O workload are each below specified thresholds) and at least a threshold amount of available or free CPU or SP resources (e.g., CPU utilization is below a specified threshold), then the criteria can specify to transition to applying the optimized read I/O processing. If for example the system is currently applying optimized read I/O processing and any one or more of the foregoing conditions is true: the cache utilization is above a threshold; BE disk utilization is above a threshold, BE controller utilization is above a threshold, BE I/O workload is above a threshold, CPU utilization is above a threshold, then the criteria can specify to transition to applying the normal read I/O processing.

Figure 11:
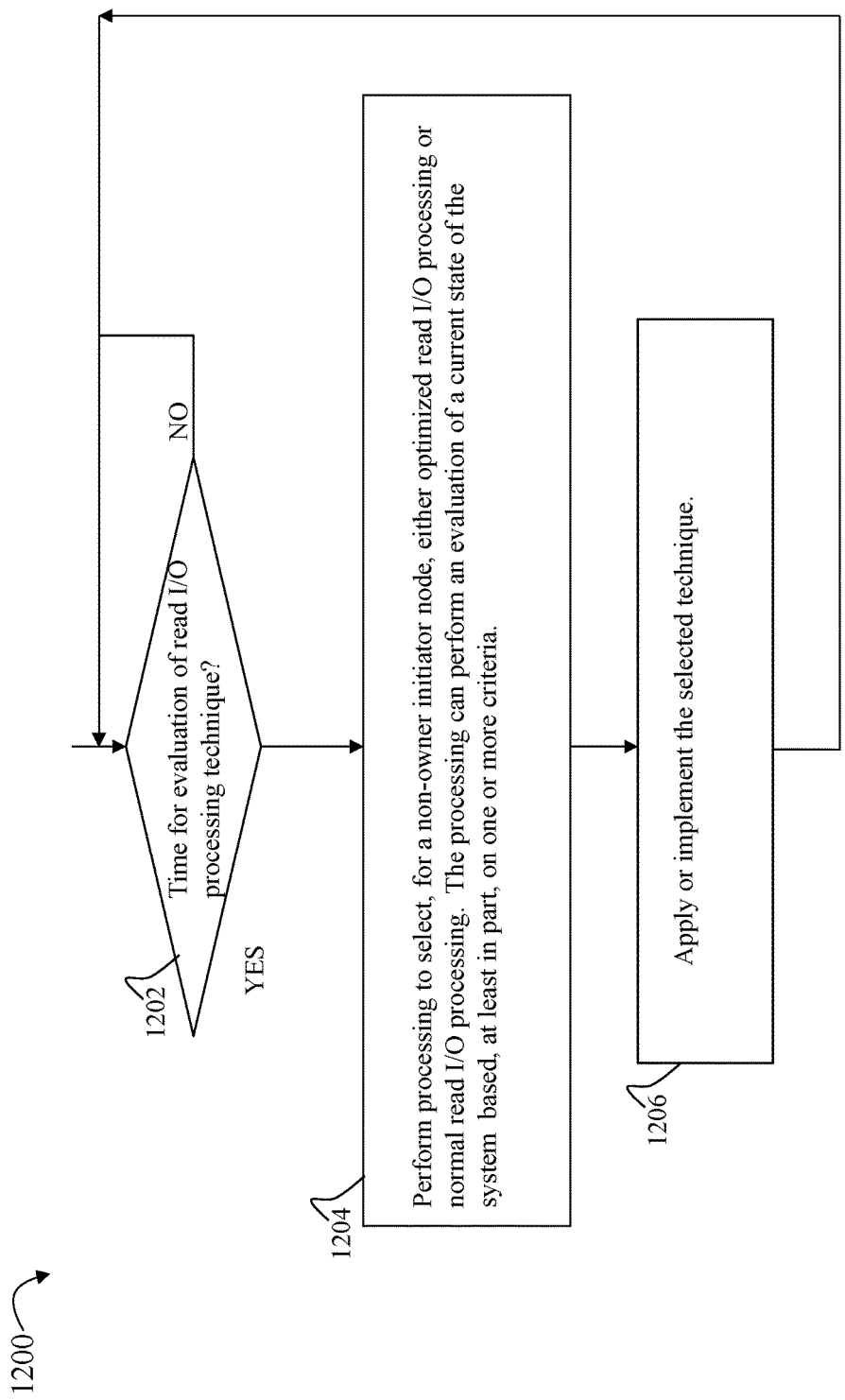

Referring to FIG. 11, shown is a flowchart 1200 summarizing processing described above in connection with dynamically selecting a caching technique or method in at least one embodiment in accordance with the techniques of the present disclosure.

At the step 1202, a determination can be made as to whether it is time to perform an evaluation. As discussed above, in at least one embodiment, such a determination and evaluation can be performed periodically. In at least one embodiment, one or more other trigger conditions or events, alone or in addition to periodic evaluation, can be specified which can result in the step 1202 evaluating to yes. If the step 1202 evaluates to no, control remains at the step 1202. If the step 1202 evaluates to yes, control proceeds to the step 1204.

At the step 1204, processing can be performed to select, for a non-owner initiator node, either optimized read I/O processing or normal read I/O processing. The processing can perform an evaluation of a current state of the system based, at least in part, on one or more criteria. In at least one embodiment, the criteria can include the dynamic evaluation criteria and generally the considerations discussed above as well as other suitable criteria and/or conditions. From the step 1204, control proceeds to the step 1206.

At the step 1206, the selected method or technique (as selected in the step 1204) can be applied or implemented in the system. The selected method or technique can be different from a currently selected method or technique. For example, at a first point in time T1, a system can be applying or implementing normal read I/O processing prior to performing the steps 1204 and 1206. As a result of performing the steps 1204 and 1206, optimized read I/O processing can be selected. In this case, the system can perform processing at runtime to dynamically switch between normal and optimized read I/O processing. From the step 1206, control proceeds to the step 1202.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving, at a first of a plurality of nodes, a read I/O operation that requests to read current content stored at a target logical address, wherein the first node does not own the target logical address and wherein a second of the plurality of nodes owns the target logical address; and
performing optimized read processing for the read I/O operation, wherein the optimized read processing includes:
performing, in parallel, first processing and second processing, wherein said first processing includes:
the first node performing first address resolution processing for the target logical address and determining a first address hint based on the first address resolution processing for the target logical address; and
the first node using the first address hint to obtain first content; and
wherein said second processing includes:
the first node issuing a first request to the second node to perform second address resolution processing for the target logical address and to return a second address hint based on the second address resolution processing for the target logical address; and
the second node sending to the first node a first response to the first request, wherein the first response includes the second address hint corresponding to the target logical address;
responsive to the first node receiving the first response, the first node determining whether the first address hint matches the second address hint;
responsive to the first node determining the first address hint matches the second address hint, performing third processing including:
the first node determining that the first content is valid content stored at the target logical address; and
responsive to the first node determining that the first address hint does not match the second address hint, performing fourth processing including:
determining that the first content is invalid and is not stored at the target logical address; and
the first node using the second address hint to obtain second content, wherein the second content corresponding to the second address hint is valid content stored at the target logical address.

2. The computer-implemented method of claim 1, wherein the first request is a remote procedure call issued from the first node to the second node, and the first response is a response to the remote procedure call.

3. The computer-implemented method of claim 1, wherein the first address resolution processing for the target logical address performed by the first node includes:
the first node using first mapping information including a first plurality of metadata (MD) pages to map the target logical address to the first address hint.

4. The computer-implemented method of claim 3, wherein the first plurality of MD pages, as used by the first node, is not guaranteed to map the target logical address to valid content currently stored at the target logical address since the first node does not own the target logical address.

5. The computer-implemented method of claim 4, wherein the second address resolution processing for the target logical address performed by the second node includes:
  the second node using second mapping information including a second plurality of MD pages to map the target logical address to the second address hint.

6. The computer-implemented method of claim 5, wherein the second plurality of MD pages, as used by the second node, is guaranteed to map the target logical address to valid content currently stored at the target logical address since the second node owns the target logical address.

7. The computer-implemented method of claim 6, wherein if the first address hint matches the second address hint, the first plurality of MD pages, as used by the first node, maps the target logical address to the first content that is determined to be valid content currently stored at the target logical address, and otherwise the first plurality of MD pages maps the target logical address to first content that is invalid content not stored at the target logical address.

8. The computer-implemented method of claim 7, wherein the first address hint is a first indirect pointer (IDP) to a physical storage location on back-end non-volatile storage including the first content.

9. The computer-implemented method of claim 8, wherein the second address hint is a second IDP to a physical storage location on back-end non-volatile storage including the second content.

10. The computer-implemented method of claim 9, wherein the second IDP is a first address V1 of a first entry E1 of a virtual layer block (VLB), wherein E1 includes a second address PA1 that is a physical storage location on back-end non-volatile storage including the second content, and wherein the first node obtains the second content in said fourth processing by performing fifth processing including:
  reading the first address V1 from a third entry of a MD leaf page comprising the first plurality of MD pages;
  reading the first entry E1 of the VLB stored at the first address V1, wherein reading the first entry E1 includes reading the second address PA1; and
  reading the second content stored at the second address PA1.

11. The computer-implemented method of claim 8, wherein the first IDP is a first address V1 of a first entry E1 of a virtual layer block (VLB), wherein E1 includes a second address PA1 that is a physical storage location on back-end non-volatile storage including the first content, and wherein the first node obtains the first content in said first processing by performing fifth processing including:
  reading the first address V1 from a third entry of a MD leaf page comprising the first plurality of MD pages;
  reading the first entry E1 of the VLB stored at the first address V1, wherein reading the first entry E1 includes reading the second address PA1; and
  reading the first content stored at the second address PA1.

12. The computer-implemented method of claim 7, wherein the first address hint is an address of, or pointer to, a physical storage location on back-end non-volatile storage including the first content.

13. The computer-implemented method of claim 12, wherein the second address hint is an address of, or pointer to, a physical storage location on back-end non-volatile storage including the second content.

14. The computer-implemented method of claim 1, further comprising:
  dynamically switching, in accordance with one or more criteria, between the optimized read processing and normal read processing for read I/O operations received by non-owner nodes with respect to target logical addresses of the read I/O operations.

15. The computer-implemented method of claim 14, where the one or more criteria are based, at least in part, on one or more metrics used to determine whether a system including the plurality of nodes has sufficient resources available to handle the additional resources needed to perform the optimized read processing rather than the normal read processing with respect to read I/Os received by non-owner nodes with respect to target logical addresses of the read I/O operations.

16. The computer-implemented method of claim 15, wherein the one or more metrics include any one or more of: one or more cache-related metrics, one or more metrics regarding CPU consumption or utilization; one or more back-end (BE) resource consumption metrics; one or more back-end I/O workload metrics; and a cache hit rate related to cached metadata pages across the plurality of nodes.

17. The computer-implemented method of claim 15, wherein the one or more criteria includes a first criteria that indicates to process the read I/Os received by non-owner nodes with respect to target logical addresses of the read I/O operations using the optimized read processing when current CPU utilization is below a specified threshold.

18. The computer-implemented method of claim 16, wherein the one or more metrics include one or more of: cache utilization, BE disk utilization, BE controller utilization, BE I/O workload, CPU utilization, and processor core utilization.

19. One or more non-transitory computer readable media comprising code stored thereon that, when executed, performs a method comprising:
  receiving, at a first of a plurality of nodes, a read I/O operation that requests to read current content stored at a target logical address, wherein the first node does not own the target logical address and wherein a second of the plurality of nodes owns the target logical address; and
  performing optimized read processing for the read I/O operation, wherein the optimized read processing includes:
    performing, in parallel, first processing and second processing, wherein said first processing includes:
      the first node performing first address resolution processing for the target logical address and determining a first address hint based on the first address resolution processing for the target logical address; and
      the first node using the first address hint to obtain first content; and
    wherein said second processing includes:
      the first node issuing a first request to the second node to perform second address resolution processing for the target logical address and to return a second address hint based on the second address resolution processing for the target logical address; and
      the second node sending to the first node a first response to the first request, wherein the first response includes the second address hint corresponding to the target logical address;
    responsive to the first node receiving the first response, the first node determining whether the first address hint matches the second address hint;

responsive to the first node determining the first address hint matches the second address hint, performing third processing including:
  the first node determining that the first content is valid content stored at the target logical address; and
responsive to the first node determining that the first address hint does not match the second address hint, performing fourth processing including:
  determining that the first content is invalid and is not stored at the target logical address; and
  the first node using the second address hint to obtain second content, wherein the second content corresponding to the second address hint is valid content stored at the target logical address.

20. A system comprising:
one or more processors; and
one or more memories comprising code stored thereon that, when executed, performs a method comprising:
  receiving, at a first of a plurality of nodes, a read I/O operation that requests to read current content stored at a target logical address, wherein the first node does not own the target logical address and wherein a second of the plurality of nodes owns the target logical address; and
  performing optimized read processing for the read I/O operation, wherein the optimized read processing includes:
    performing, in parallel, first processing and second processing, wherein said first processing includes:
      the first node performing first address resolution processing for the target logical address and determining a first address hint based on the first address resolution processing for the target logical address; and
      the first node using the first address hint to obtain first content; and
    wherein said second processing includes:
      the first node issuing a first request to the second node to perform second address resolution processing for the target logical address and to return a second address hint based on the second address resolution processing for the target logical address; and
      the second node sending to the first node a first response to the first request, wherein the first response includes the second address hint corresponding to the target logical address;
    responsive to receiving the first response, the first node determining whether the first address hint matches the second address hint;
    responsive to the first node determining the first address hint matches the second address hint, performing third processing including:
      the first node determining that the first content is valid content stored at the target logical address; and
    responsive to the first node determining that the first address hint does not match the second address hint, performing fourth processing including:
      determining that the first content is invalid and is not stored at the target logical address; and
      the first node using the second address hint to obtain second content, wherein the second content corresponding to the second address hint is valid content stored at the target logical address.

* * * * *